United States Patent
Tysowski

(10) Patent No.: US 8,320,943 B2
(45) Date of Patent: Nov. 27, 2012

(54) SYSTEM AND METHOD FOR ENABLING INSTANT MESSAGES TO BE EXCHANGED BETWEEN MOBILE DEVICES

(75) Inventor: Piotr Konrad Tysowski, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1144 days.

(21) Appl. No.: 12/038,466

(22) Filed: Feb. 27, 2008

(65) Prior Publication Data

US 2009/0215476 A1     Aug. 27, 2009

(51) Int. Cl.
*G06F 15/16*     (2006.01)

(52) U.S. Cl. ............... 455/466; 455/412.2; 709/206

(58) Field of Classification Search ........... 455/466, 455/412.1, 412.2, 555; 709/206
See application file for complete search history.

(56) References Cited

U.S. PATENT DOCUMENTS

| | | | | |
|---|---|---|---|---|
| 8,229,413 | B2 * | 7/2012 | Brown et al. | 455/419 |
| 2005/0058094 | A1 * | 3/2005 | Lazaridis et al. | 370/328 |
| 2005/0091272 | A1 * | 4/2005 | Smith et al. | 707/104.1 |
| 2005/0164651 | A1 * | 7/2005 | Ollis et al. | 455/100 |
| 2005/0261011 | A1 * | 11/2005 | Scott | 455/466 |
| 2006/0009243 | A1 * | 1/2006 | Dahan et al. | 455/466 |
| 2006/0141941 | A1 * | 6/2006 | Zacks et al. | 455/73 |
| 2007/0027921 | A1 | 2/2007 | Alvarado et al. | |
| 2007/0129014 | A1 * | 6/2007 | Bertorello et al. | 455/41.2 |
| 2007/0162554 | A1 * | 7/2007 | Branda et al. | 709/207 |
| 2007/0280179 | A1 | 12/2007 | Van Belle et al. | |
| 2009/0043857 | A1 * | 2/2009 | Ferlitsch | 709/206 |
| 2009/0100184 | A1 * | 4/2009 | Chakra et al. | 709/229 |
| 2009/0229063 | A1 * | 9/2009 | Merl et al. | 15/167.1 |
| 2009/0234876 | A1 * | 9/2009 | Schigel et al. | 707/102 |

FOREIGN PATENT DOCUMENTS

EP     1653697 A1     5/2006

OTHER PUBLICATIONS

Extended Search Report from European Application No. 08152015.7 dated Jul. 28, 2008.
Tyson, Jeff, and Cooper, Alison; "How Instant Messaging Works"; Mar. 28, 2001; HowStuffWorks.com.; Available from http://communication.howstuffworks,com/instant-messaging.htm; Retrieved Nov. 7, 2008.
"Using the Instant Messaging Client"; Opera Software ASA; Available from http://www.opera.com/support/tutorials/win/im/; Retrieved Nov. 7, 2008.

* cited by examiner

*Primary Examiner* — Lester Kincaid
*Assistant Examiner* — Steven Kelley
(74) *Attorney, Agent, or Firm* — Brett J. Slaney; Blake, Cassels & Graydon LLP

(57) ABSTRACT

A system and method are provided for enabling instant messages to be exchanged between mobile devices, in particular where a mobile device has access to information pertaining to another mobile device. The system enables an instant messaging application to communicate directly with the other mobile device, without requiring an initial email exchange. New contacts can be added automatically and access to other data such provided by having a mobile device access information for another mobile device. The information can be made available through a contact server of the host system common to both mobile devices thereby providing a trusted mechanism to establish the new contacts. In one example, in a PIN-to-PIN based messaging system, a global address list (GAL) look-up can be incorporated into an option for adding a new contact so that the PIN for the invitee is obtained directly and the invitation sent immediately in a PIN-to-PIN message thus not requiring an email invitation.

36 Claims, 18 Drawing Sheets

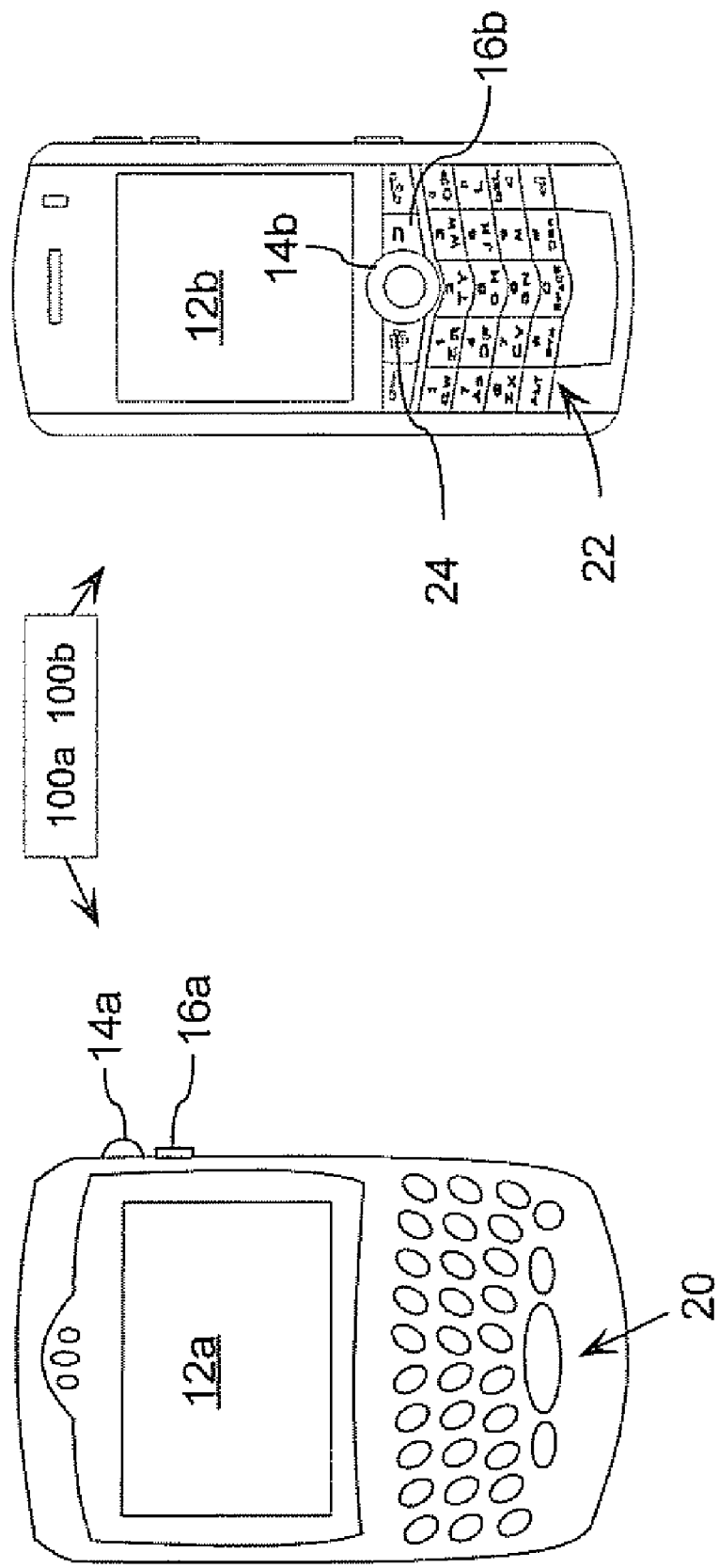

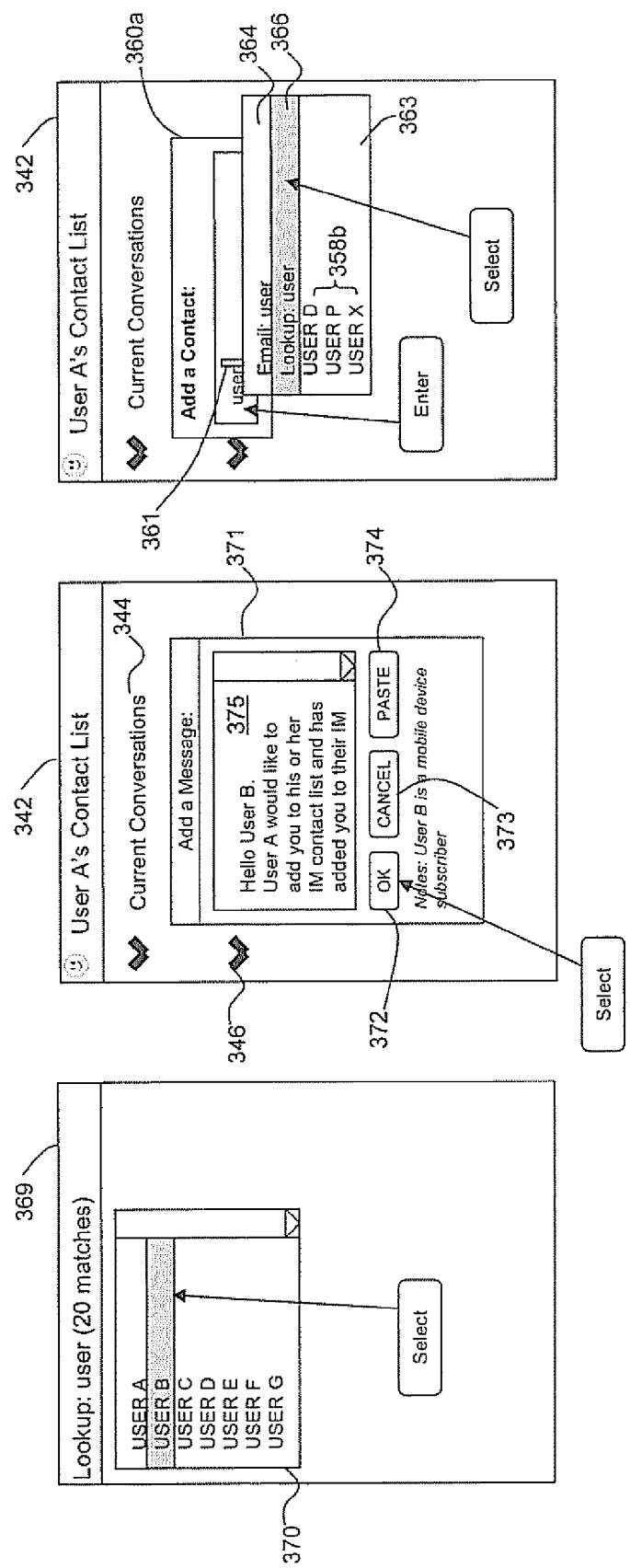

SYSTEM AND METHOD FOR ENABLING INSTANT MESSAGES TO BE EXCHANGED BETWEEN MOBILE DEVICES

TECHNICAL FIELD

The following relates to systems and methods for enabling instant messages to be exchanged between mobile devices.

DESCRIPTION OF THE RELATED ART

The use of instant messaging has become an increasingly popular way to communicate and has naturally evolved to include instant messaging applications for mobile devices. In some cases, mobile versions of traditional instant messaging applications used in the desktop environment have been developed for use on a mobile device. These instant messaging applications generally communicate by accessing the same central instant messaging server that a desktop instant messaging application would. In other cases, a proprietary instant messaging application is included with or available to be downloaded to the mobile device. Such proprietary instant messaging applications are typically developed by the mobile device manufacturer, are meant to be used only with that type of mobile device, and use some form of direct communication between the mobile devices.

Instant messaging is different from other forms of communication such as telephone and email, since the users do not actively associate a recipient in the instant messaging session with a number or address but rather they select another identifier for that contact (e.g. name) as shown in their contact list and simply begin a new conversation or continue with an existing conversation, i.e. the instant messaging application carries out the addressing for instant messages. However, in order to establish the communication link between users, the user must be able to communicate with the device that hosts the instant messaging application at the recipient end. This requires knowledge that the recipient has or will obtain the instant messaging application. The user also typically sends an invitation requesting that the recipient be added to the user's contact list so that they can thereafter initiate instant messaging sessions or "conversations".

In order to invite other users to be added to your contact list (and vice versa), an initiating message or invitation is prepared and sent to the intended recipient. When a fully functional instant messaging server is already present, this may involve the user identifying the recipient according to a name or email address and the instant messaging server then sending the invitation to the recipient. When an instant messaging server is not used but rather another form of direct communication between the mobile devices is, typically another medium such as email is first used to convey the invitation. One drawback may be that having a fully operational instant messaging server requires additional overhead and thus may be undesirable in some environments. Another drawback is that if a more direct form of communication is used, the additional steps involved in exchanging emails to add a contact can be time consuming and cumbersome. Also, email invitations sent to users that do not have a mobile device, i.e. cannot participate in a mobile instant messaging application, can become a nuisance to the invitee.

BRIEF DESCRIPTION OF THE DRAWINGS

Embodiments will now be described by way of example only with reference to the appended drawings wherein:

FIG. 2 is a schematic diagram of a mobile device and a display screen therefor.

FIG. 3 is a schematic diagram of another mobile device and a display screen therefor.

FIGS. 15(a) to 15(h) are screen shots illustrating a user interface (UI) for adding a new contact to a contact list in an instant messaging program using a GAL lookup.

FIG. 16 is a screen shot illustrating a UI for adding a new contact to a contact list in an instant messaging program using a GAL lookup in another embodiment.

DETAILED DESCRIPTION

Figure 1:
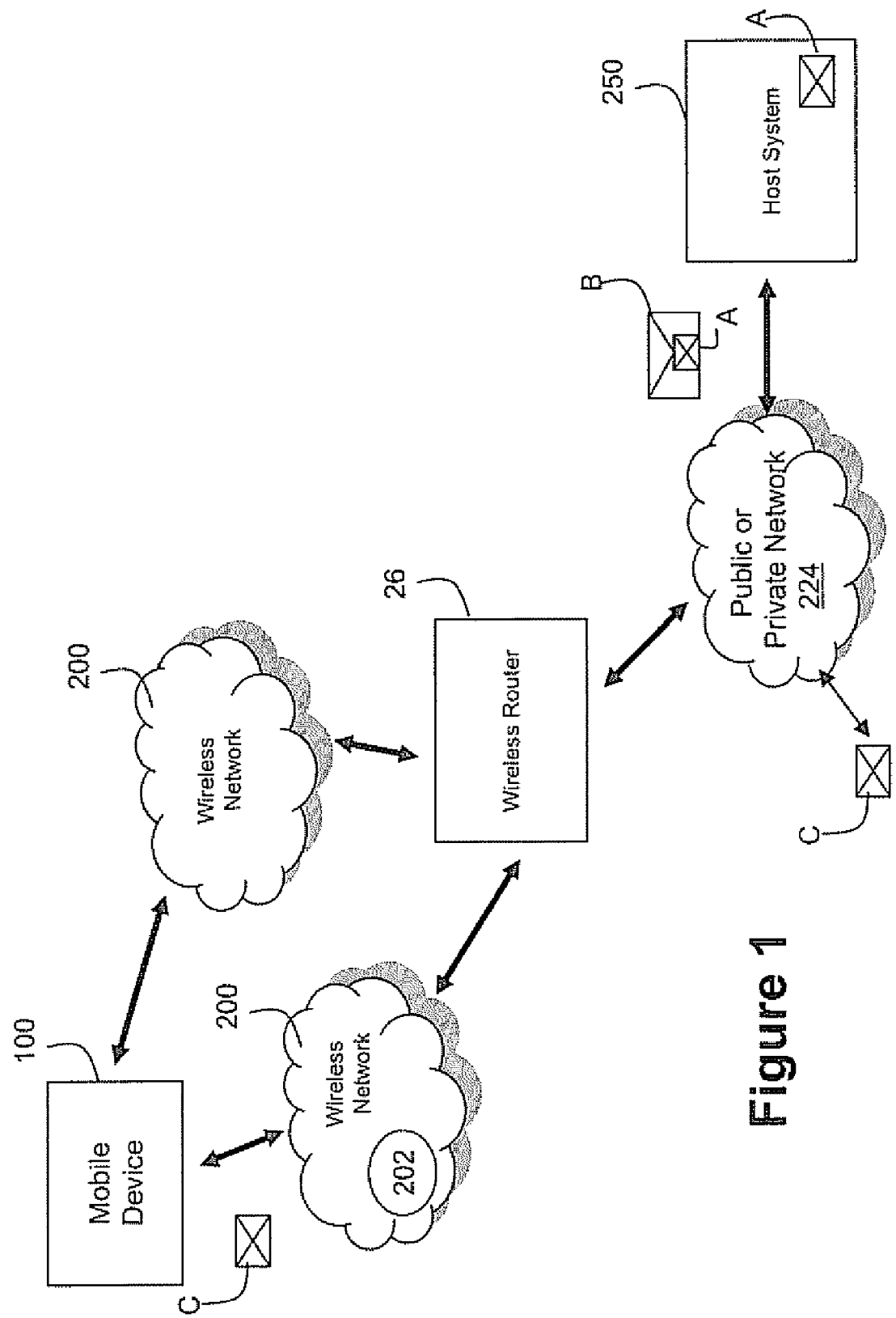
FIG. 1 is a system diagram illustrating the environment in which data items are pushed from a host system to a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein.

Also, the description is not to be considered as limiting the scope of the embodiments described herein.

It has been recognized that in systems where a mobile communication device has access to information pertaining to another mobile device, the other mobile device can be contacted directly by an instant messaging application to initiate an instant messaging session, in particular to add a new contact and immediately begin such instant messaging session, without requiring an initial email exchange. In this way, new contacts can be added automatically by obtaining addressing information, and access to other data such as public key certificates enables the instant messages to be protected. The information is, in one embodiment, available through a contact server of a host system common to both mobile devices thereby providing a trusted mechanism to establish the new contacts. For example, as will be described below, in a PIN-to-PIN based messaging system, a global address list (GAL) lookup can be incorporated into an option for adding a new contact so that the PIN for the invitee is obtained directly and the invitation sent immediately in a PIN-to-PIN message thus not requiring an email-based invitation. The other information available through the GAL lookup can also enable the user to customize the invitation message and avoid sending invitations to members of the GAL that do not have a mobile device.

It has also be recognized that by accessing the information for the other mobile device, instant messages can be protected, even when outside of the host system's firewall, e.g. by using an available public key certificate to encrypt instant messaging traffic. In this way, access to the information handled by the entity common to both mobile devices provides a distribution channel for using certificates to increase security and to obtain any other information that is made available.

Examples of applicable communication devices include pagers, cellular phones, cellular smart-phones, wireless organizers, personal digital assistants, computers, laptops, handheld wireless communication devices, wirelessly enabled notebook computers and the like. Such devices will hereinafter be commonly referred to as "mobile devices" for the sake of clarity.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities).

The mobile device is preferably one that is used in a system that is configured for continuously routing all forms of pushed information from a host system to the mobile device. One example of such a system will now be described.

Figure 8:
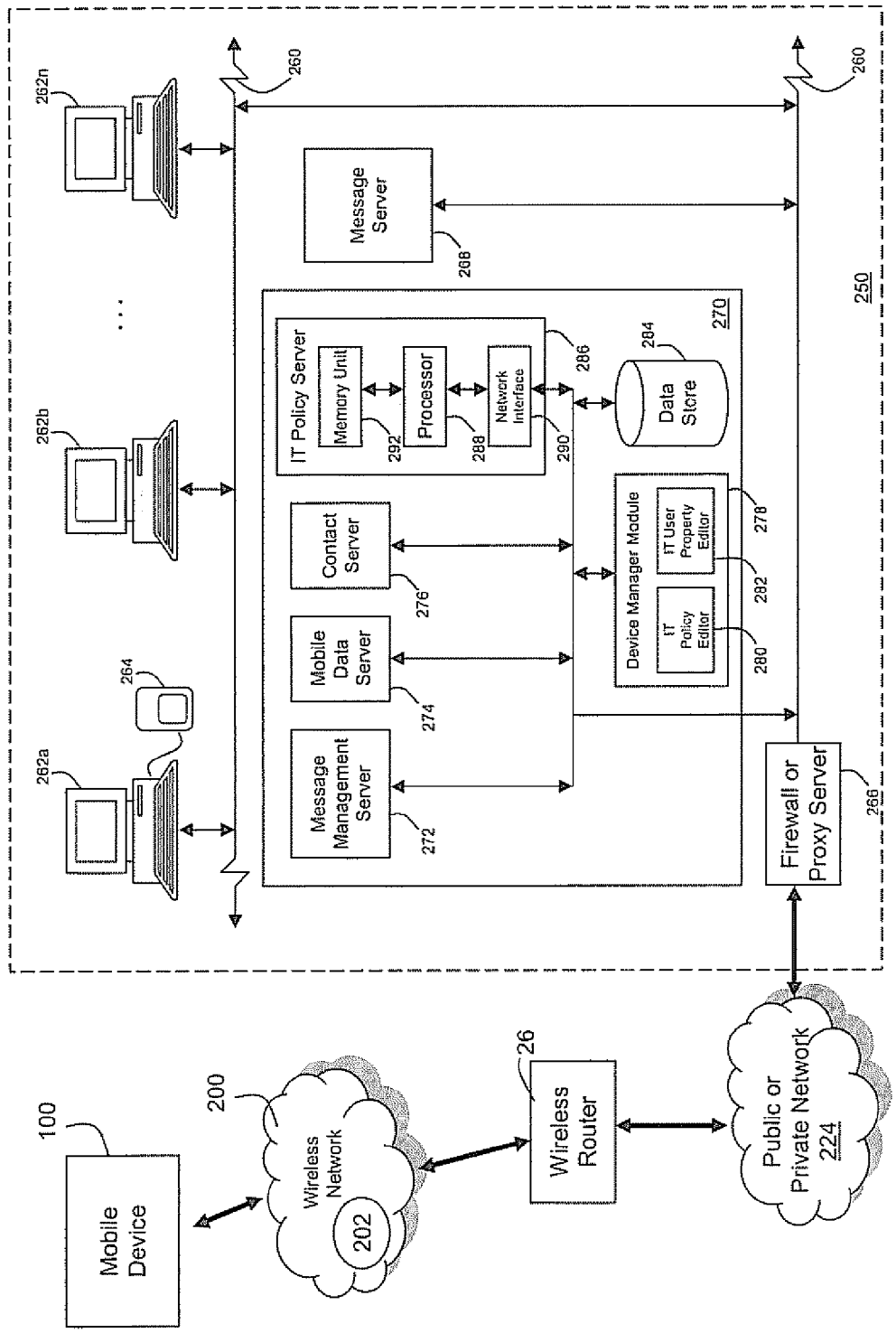
FIG. 8 is a block diagram illustrating components of a host system in one exemplary configuration for use with the system shown in FIG. 1.

Referring now to the drawings, FIG. 1 is an example system diagram showing the redirection of user data items (such as message A or C) from a corporate enterprise computer system (host system) 250 to the user's mobile device 100 via a wireless router 26. The wireless router 26 provides the wireless connectivity functionality as it acts to both abstract most of the wireless network's 200 complexities, and it also implements features necessary to support pushing data to the mobile device 100. Although not shown, a plurality of mobile devices may access data from the host system 250. In this example, message A in FIG. 1 represents an internal message sent from, e.g. a desktop computer 262 within the host system 250 (see FIG. 8), to any number of server computers in the corporate network 260 (e.g. LAN), which may, in general, include a database server, a calendar server, an E-mail server or a voice-mail server. More detail concerning the host system 250 will be provided below and is shown in FIG. 8 as noted above.

Message C in FIG. 1 represents an external message from a sender that is not directly connected to the host system 250, such as the user's mobile device 100, some other user's mobile device (not shown), or any user connected to the public or private network 224 (e.g. the Internet). Message C could be e-mail, voice-mail, calendar information, database updates, web-page updates or could even represent a command message from the user's mobile device 100 to the host system 250. The host system 250 preferably includes, along with the typical communication links, hardware and software associated with a corporate enterprise computer network system, one or more wireless mobility agents, a TCP/IP connection, a collection of datastores, (i.e. for example a data store for e-mail could be an off-the-shelf mail server like Microsoft Exchange® Server or Lotus Notes® Server), all within and behind a corporate firewall as will be explained further below.

The mobile device 100 is adapted for communication within wireless network 200 via wireless links, as required by each wireless network 200 being used. As an illustrative example of the operation for a wireless router 26 shown in FIG. 1, consider a data item A, repackaged in outer envelope B (the packaged data item A now referred to as "data item (A)") and sent to the mobile device 100 from an Application Service Provider (ASP) in the host system 250. Within the ASP is a computer program, similar to a wireless mobility agent, running on any computer in the ASP's environment that is sending requested data items from a data store to a mobile device 100. The mobile-destined data item (A) is routed through the network 224, and through the wireless router's 26 firewall 27 protecting the wireless router 26.

Although the above describes the host system 250 as being used within a corporate enterprise network environment, this is just one embodiment of one type of host service that offers push-based messages for a handheld wireless device that is capable of notifying and preferably presenting the data to the user in real-time at the mobile device when data arrives at the host system.

The wireless router 26 provides a range of services to make creating a push-based host service straightforward, which is essential to the success of wireless data networks. These networks can include. (1) the Code Division Multiple Access (CDMA) network that has been developed and operated by Qualcomm, (2) the Groupe Special Mobile or the Global System for Mobile Communications (GSM) and the General Packet Radio Service (GPRS) both developed by the standards committee of CEPT, and (3) the future third-generation (3G) networks like EDGE and UMTS. GPRS is a data overlay on top of the very popular GSM wireless network, operating in virtually every country in Europe. Some older examples of data-centric network include, but are not limited to: (1) the Mobitex Radio Network ("Mobitex"), which has been developed by Eritel and Ericsson of Sweden, and is operated by Cingular Corporation in the United States, and (2) the DataTAC Radio Network ("DataTAC"), which has been developed by Motorola and is operated by Motient Corporation, in the United States.

Referring now to FIGS. 2 and 3, one embodiment of a mobile device 100a is shown in FIG. 2, and another embodiment of a mobile device 100b is shown in FIG. 3. It will be appreciated that the numeral "100" will hereinafter refer to any mobile device 100, including the embodiments 100a and 100b, those embodiments enumerated above or otherwise. It will also be appreciated that a similar numbering convention may be used for other general features common between FIGS. 2 and 3 such as a display 12, a positioning device 14, and a cancel or escape button 16.

The mobile device 100a shown in FIG. 2 comprises a display 12a and the cursor or view positioning device 14 shown in this embodiment is a positioning wheel 14a. Positioning device 14 may serve as another input member and is both rotatable to provide selection inputs to the main processor 102 (see FIG. 4) cad can also be pressed in a direction generally toward housing to provide another selection input to the processor 102. The display 12 may include a selection cursor 18 that depicts generally where the next input or selection will be received. The selection cursor 18 may comprise a box, alteration of an icon or any combination of features that enable the user to identify the currently chosen icon or item. The mobile device 100a in FIG. 2 also comprises an escape or cancel button 16a and a keyboard 20. In this example the keyboard 20 is disposed on the front face of the mobile device housing and positioning device 14 and cancel button 16a are disposed at the side of the housing to enable a user to manoeuvre the positioning wheel 16a while holding the mobile device 100 in one hand. The keyboard 20 is, in this embodiment, a standard QWERTY keyboard.

The mobile device 100b shown in FIG. 3 comprises a display 12b and the positioning device 14 in this embodiment is a trackball 14b. Trackball 14b permits multi-directional positioning of the selection cursor 18 such that the selection cursor 18 can be moved in an upward direction, in a downward direction and, if desired and/or permitted, in any diagonal direction. The trackball 14b is preferably situated on the front face of a housing for mobile device 100b as shown in FIG. 3 to enable a user to manoeuvre the trackball 14b while holding the mobile device 100b in one hand. The trackball 14b may serve as another input member (in addition to a directional or positioning member) to provide selection inputs to the processor 102 and can preferably be pressed in a direction towards the housing of the mobile device 100b to provide such a selection input.

The mobile device 100b also comprises a menu or option button 24 that loads a menu or list of options on display 12b when pressed, and a cancel or escape button 16b to exit, "go back" or otherwise escape from a feature, option, selection or display. The mobile device 100b as illustrated in FIG. 3, comprises a reduced QWERTY keyboard 22. In this embodiment, the keyboard 22, positioning device 14, escape button 16b and menu button 24 are disposed on a front face of a mobile device housing. The reduced QWERTY keyboard 22 comprises a plurality of multi-functional keys and corresponding indicia including keys associated with alphabetic characters corresponding to a QWERTY array of letters A to Z and an overlaid numeric phone key arrangement.

It will be appreciated that for the mobile device 100, a wide range of one or more positioning or cursor/view positioning mechanisms such as a touch pad, a joystick button, a mouse, a touchscreen, set of arrow keys, a tablet, an accelerometer (for sensing orientation and/or movements of the mobile device 100 etc.), or other whether presently known or unknown may be employed. Similarly, any variation of keyboard 20, 22 may be used. It will also be appreciated that the mobile devices 100 shown in FIGS. 2 and 3 are for illustrative purposes only and various other mobile devices 100, presently known or unknown are equally applicable to the following examples. For example, other mobile devices 100 may include the trackball 14b, escape button 16b and menu or option button 24 similar to that shown in FIG. 3 only with a fall or standard keyboard of any type. Other button may also be disposed on the mobile device housing such as colour coded "Answer" and "Ignore" buttons (not shown) to be used in telephonic communications.

To aid the reader in understanding the structure of the mobile device 100 and how it communicates with the wireless network 200, reference will now be made to FIGS. 4 through 7.

Figure 4:
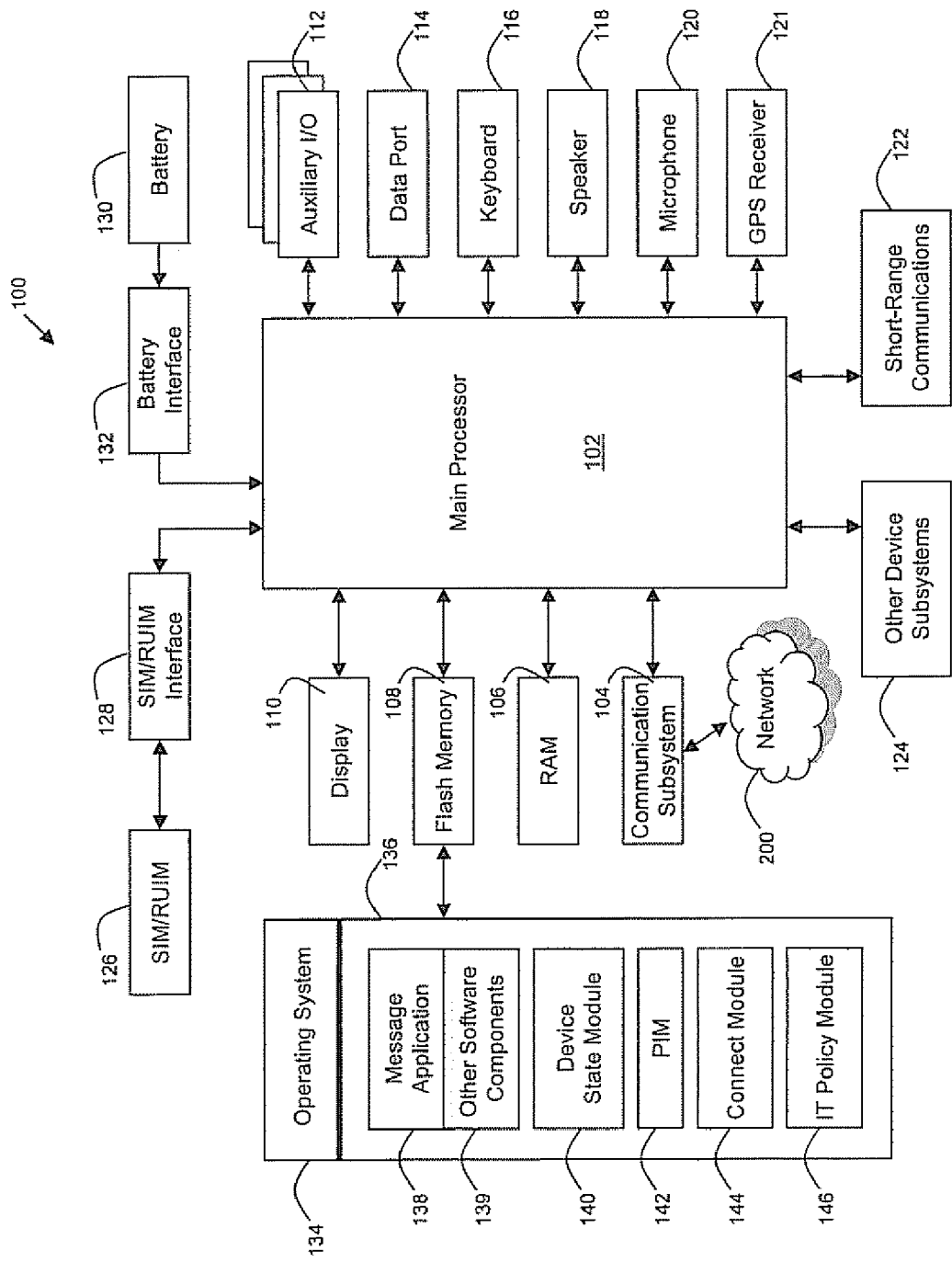
FIG. 4 is a block diagram of an exemplary embodiment of a mobile device.

Referring first to FIG. 4, shown therein is a block diagram of an exemplary embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this exemplary embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data OSM Environment (EDGE) and Universal Mobile Telecommunications Service (UMTS). New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some embodiments, the 22 battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of 22 interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 10 and 11, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system 250. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications or components 139 can also be installed on the mobile device 100. These software applications 139 can be pre-installed applications (i.e. other than message application 138) or third party applications, which are added after the manufacture of the mobile device 100. Examples of third party applications include games, calculators, utilities, etc.

The additional applications 139 can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 5:
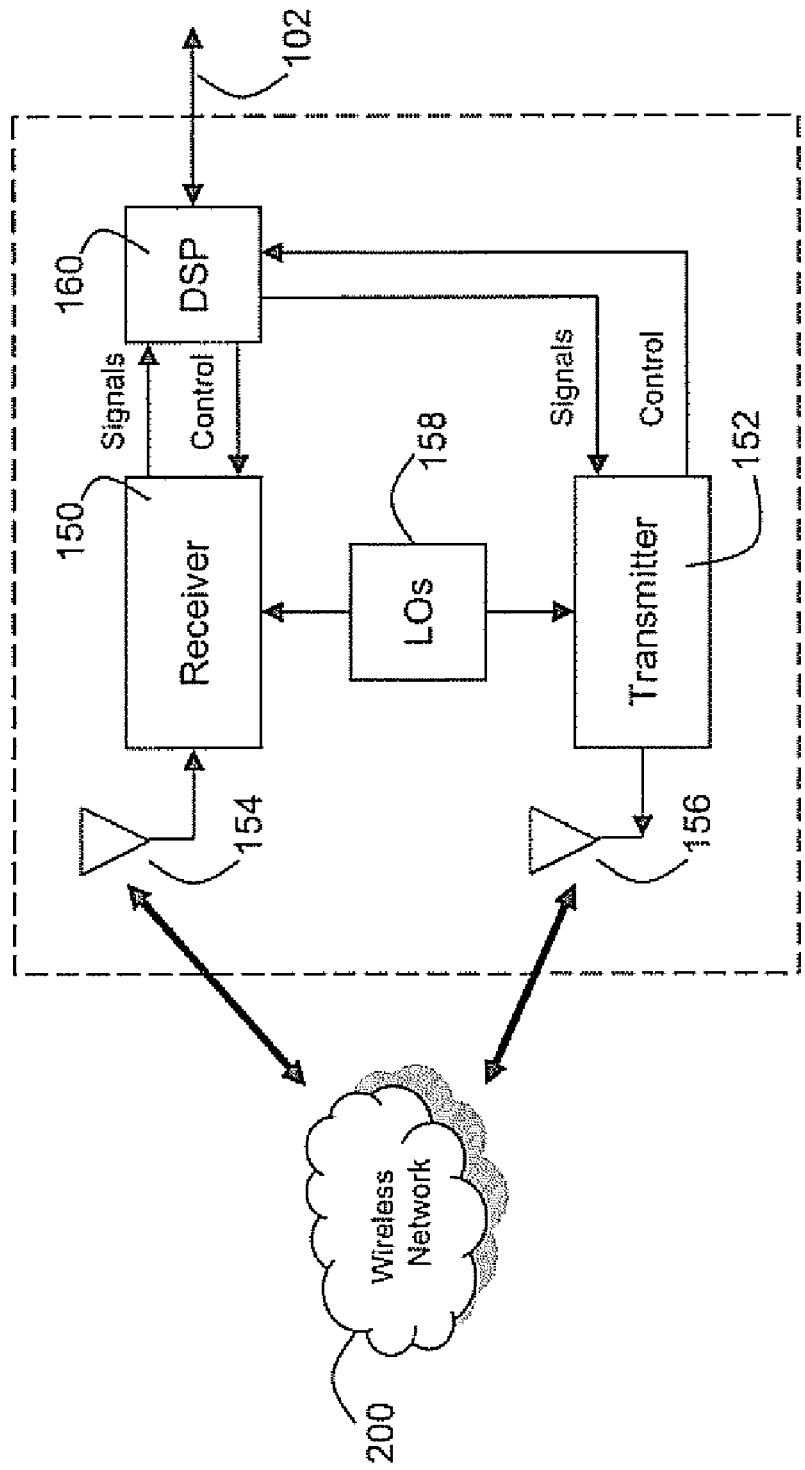
FIG. 5 is a block diagram of an exemplary embodiment of a communication subsystem component of the mobile device of FIG. 3.

Referring now to FIG. 5, an exemplary block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 5 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, hut also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 6:
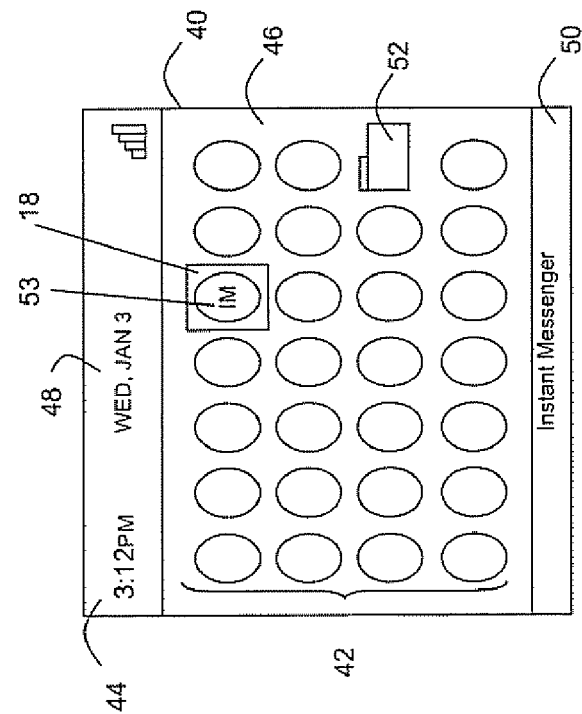
FIG. 6 is a screen shot of a home screen displayed by the mobile device.

Turning now to FIG. 6, the mobile device 100 displays a home screen 40, which is preferably the active screen when the mobile device 100 is powered up and constitutes the main ribbon application. The home screen 40 generally comprises a status region 44 and a theme background 46, which provides a graphical background for the display 12. The theme background 46 displays a series of icons 42 in a predefined arrangement on a graphical background. In some themes, the home screen 40 may limit the number icons 42 shown on the home screen 40 so as to not detract from the theme background 46, particularly where the background 46 is chosen for aesthetic reasons. The theme background 46 shown in FIG. 6 provides a grid of icons. It will be appreciated that preferably several themes are available for the user to select and that any applicable arrangement may be used. One or more of the series of icons 42 is typically a folder 52 that itself is capable of organizing any number of applications therewithin.

The status region 44 in this embodiment comprises a date/time display 48. The theme background 46, in addition to a graphical background and the series of icons 42, also comprises a status bar 50. The status bar 50 provides information to the user based on the location of the selection cursor 18, e.g. by displaying a name for the icon 52 that is currently highlighted.

An application, such as instant messaging application 54 may be initiated (opened or viewed) from display 12 by highlighting a corresponding icon 53 using the positioning device 14 and providing a suitable user input to the mobile device 100. For example, instant messaging application 54 may be initiated by moving the positioning device 14 such that the icon 53 is highlighted by the selection box 18 as shown in FIG. 6, and providing a selection input, e.g. by pressing the trackball 14b.

Figure 7:
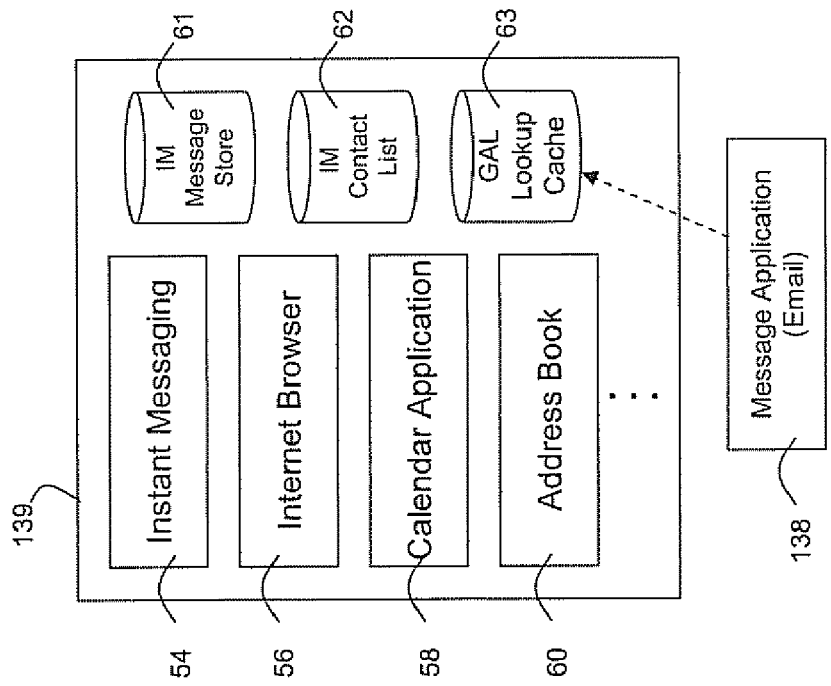
FIG. 7 is a block diagram illustrating exemplary ones of the other software applications and components shown in FIG. 4.

FIG. 7 shows an example of the other software applications and components 139 that may be stored and used on the mobile device 100. Only examples are shown in FIG. 7 and such examples are not to be considered exhaustive. In this example, the instant messaging application 54, Internet browser 56, calendar application 58 and address book 60 are shown to illustrate the various programs and applications that can be used on the mobile device 100. Also shown in FIG. 7 is an instant messaging (IM) message store 61, which is a memory component or allocation of memory for saving instant messages and conversations; an IM Contact List 62, which is a memory component or allocation for storing details and data pertaining to other instant messaging users or "contacts", also commonly referred to as a "buddy list"; and a global address list (GAL) lookup cache 63, which is a memory component or allocation for storing data and information acquired from a GAL, typically associated with the host system 250. Although the data stores 61-63 are shown as separate components in FIG. 7, it will be appreciated that such depiction is for clarity only and such data stores 61-63 may instead be included in one or two or more than three separate memory components or allocations of memory.

Referring now to FIG. 8, shown therein is a block diagram illustrating components of an exemplary configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 6, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's mobile device 100 is situated on a LAN connection. The cradle 264 for the mobile device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 8. Furthermore, only a subset of network components of the host system 250 are shown in FIG. 8 for ease of exposition, and it will be understood by persons skilled in the art that the host system 250 will comprise additional components that are not explicitly shown in FIG. 8 for this exemplary configuration. More generally, the host system 250 may represent a smaller part of a larger network (not shown) of the organization, and may comprise different components and/or be arranged in different topologies than that shown in the exemplary embodiment of FIG. 8.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this exemplary embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to me mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some exemplary implementations of the message server 268 include a Microsoft Exchange® server, a Lotus Domino™ server, a Novell Groupwise™ server, or another suitable mail server installed in a corporate environment. In some implementations, the host system 250 may comprise multiple message servers 268. The message server 268 may also be adapted to provide additional functions beyond message management, including the management of data associated with calendars and task lists, for example.

When messages are received by the message server 268, they are typically stored in a data store associated with the message server 268. In at least some embodiments, the data store may be a separate hardware unit such as data store 284, that the message server 268 communicates with. Messages can be subsequently retrieved and delivered to users by accessing the message server 268. For instance, an e-mail client application operating on a user's computer 262a may request the e-mail messages associated with that user's account stored on the data store associated with the message server 268. These messages are then retrieved from the data store and stored locally on the computer 262a. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have e-mail messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g. 2 KB). The user can then request that more of the message be delivered in similar-sized blocks by the message management server 272 to the mobile device 100, possibly up to a maximum predefined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may comprise multiple message management servers 272, particularly in variant implementations where a large number of mobile devices need to be supported.

Figure 9:
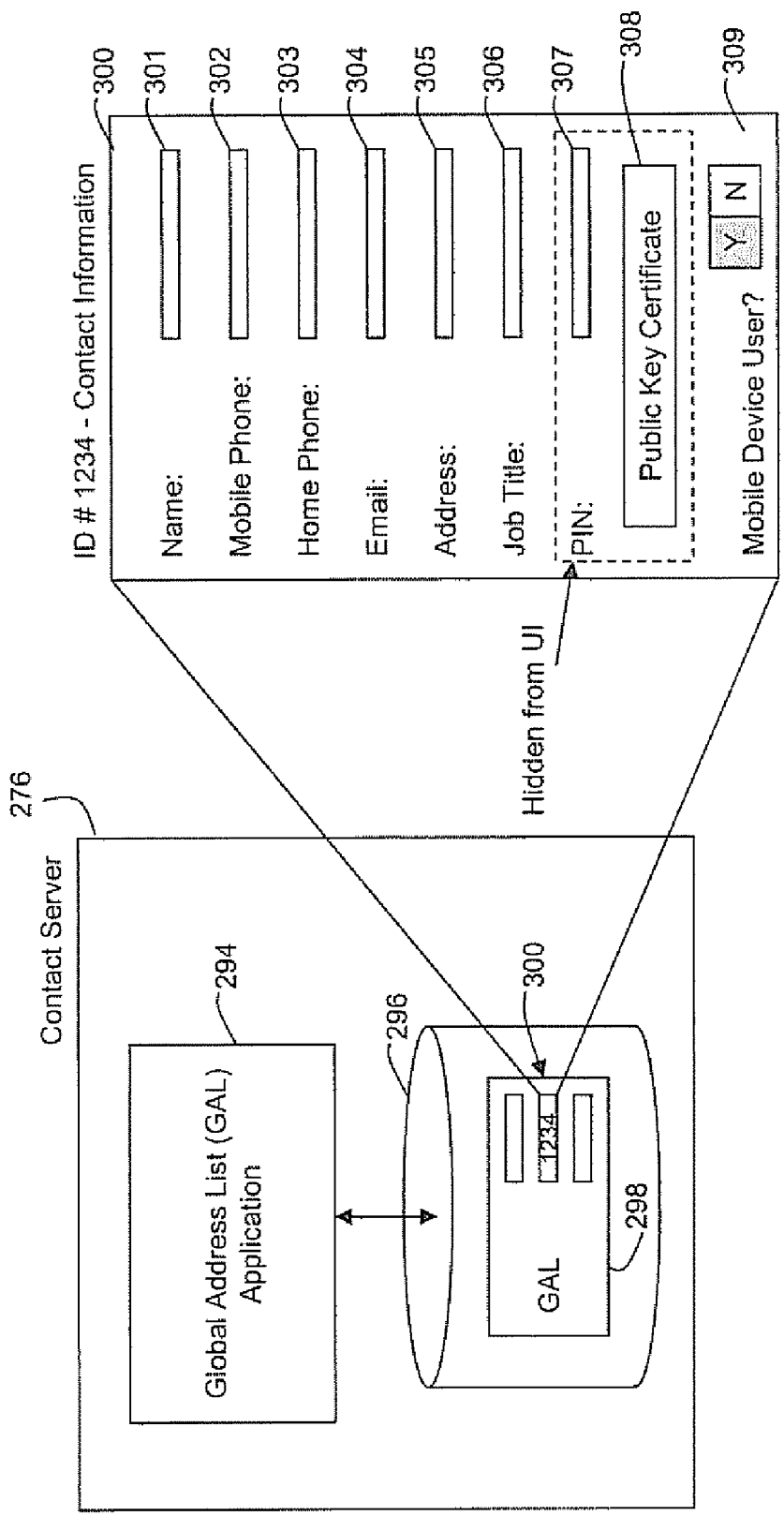
FIG. 9 is a system diagram showing further detail of the contact server shown in FIG. 8.

Further detail of the contact server 276 is shown in FIG. 9. As mentioned above, the mobile device 100 includes a GAL lookup cache 63 for storing data that has been recently acquired from a GAL 298. As can be seen in FIG. 9, the contact server 276 preferably includes a GAL application 294, which is a front-end application accessible by users associated with the host system 250, including mobile devices 100. The GAL application 294 has access to a main GAL data store 296, which stores the contents of the GAL 298 for that particular host system 250. Each member in the GAL 298 has a corresponding GAL member profile 300, which contains various data pertaining to the corresponding member, in particular contact information. In the example shown in FIG. 9, an arbitrary member #1234 is identified. The member profile 300 in this example comprises various fields for identifying member #1234, including name 301, mobile phone number 302, home phone number 303, email address 304, home address 305 and job title/position 306. Such contact details are preferably available to any user for the purpose of obtaining information regarding the user identified as #1234 by the contact server 276, and is typically available through a user interface (UI).

Other data may be stored in the member profile 300 that is normally transparent to the user and used only by the underlying application or protocol. For example, if the member is a mobile device user, they may have a personal identification number (PIN) 307 that is not available to the user through a UI (e.g. for privacy reasons), but can be accessed by, e.g. the instant messaging application 54 for the purpose of addressing an instant message to a recipient as will be explained below. Also shown in FIG. 9 is a public key certificate 308 for member 1234 which is used to digitally sign messages sent from a mobile device 100 and may also be stored in the user's mailbox, e.g. for encrypting and decrypting email traffic. In this way, certificates 308 for other mobile devices 100 are also available through the GAL 298. The certificate may be sent with the other contact details 301-306 when obtaining information from the member entry 300 during a GAL lookup operation as will be explained below. The certificate 308 includes the user's public key and digital signature of the certificate as issued by the organization's certificate authority.

Other information that may or may not be accessible to the user can also be stored in the member profile 300. For example, an entry 309 that indicates whether or not that user is a mobile device user may be included. This may be used to visually indicate whether or not a PIN 307 is available, since the PIN 307 is hidden from the UI. If the mobile device 100 can detect the existence of a PIN 307, this implies that the user is a mobile device user and thus the entry 309 typically does not need to be accessed and is shown for illustrative purposes only. It may be understood that there may be members in the host system 250 that do not use a mobile device 100 while others do. In this case, the GAL 298 can indicate the communication capabilities of the intended recipient. As explained below, this can facilitate the process of adding contacts to a contact list for instant messaging.

Figure 10:
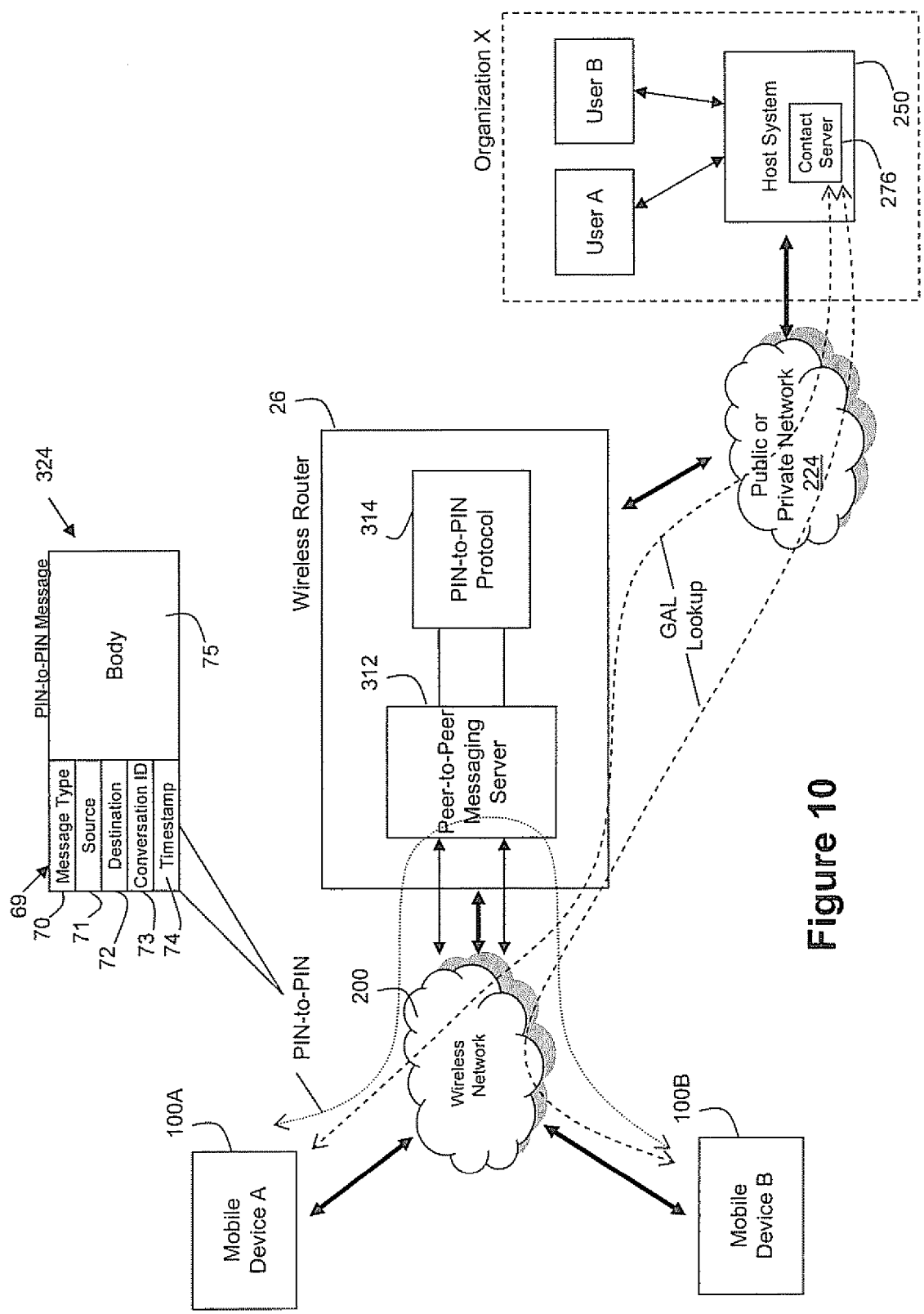
FIG. 10 is a system diagram showing one configuration for facilitating peer-to-peer messaging and global address list (GAL) lookup operations.

The PIN 307 shown in FIG. 9 is a record of the PIN 307 associated with the corresponding mobile device 100. The PIN 307 can be used by the instant messaging application 54 on the mobile device 100 for sending instant messages or engaging in chat sessions directly with another user through a peer-to-peer messaging server 312 as shown in FIG. 10. It will be appreciated that the following principles may also be applied to a short message service (SMS) based messaging system or any other "instant" chat-type messaging services.

In the following embodiment shown in FIG. 10, a PIN-based messaging system is implemented using a server-based communication infrastructure, such as one that provides email, SMS, voice, Internet and other communications. Particularly suitable for hosting the peer-to-peer messaging server 312, is the wireless router 26 used in systems such as those shown in FIG. 1. In FIG. 10 the wireless router 26 facilitates instant messaging between a mobile device for user A, denoted by 100A and a mobile device for user B, denoted by 100B. User A and User B belong to Organization X, e.g. are employees of Organization X, which includes a host system 250, the host system 250, in part, including a contact server 276 as shown in FIG. 9. Instant messaging is provided by the instant messaging program 54 stored on each mobile device 100A, 100B, which is initiated from the home screen 40 by highlighting and selecting the instant messaging icon 53 as illustrated in FIG. 6. The wireless router 26 relays messages between the mobile devices 100A, 100B according to a PIN-to-PIN protocol 314.

An instant message is generally denoted by numeral 324 as shown in FIG. 10. As noted above, in this embodiment, the message 324 is a PIN-based message. In a PIN-based messaging protocol 314, each message 324 has associated therewith a PIN 307 corresponding to the mobile device 100 which has sent the message 324 and includes a destination PIN 307 identifying the intended recipient. Further detail of an example structure for the messages 324 is also shown in FIG. 10. Each message 324 generally comprises a body 75, which contains the content for the message 324 (e.g. text), and a header 69, which contains various fields used for transmitted and processing each message 324. In this example, the header 69 includes a message type field 70 to specify the type of transmission (e.g. PIN, SMS etc.), a source field 71 to specify the device address for the sender, a destination field 72 to specify the device address for the intended recipient, a conversation ID field 73 to specify in which conversation thread the message 324 should be stored (i.e. contains a copy of the conversation ID 73 given to each conversation or session or thread created by the instant messaging application 54), and a timestamp field 74 to indicate the time (and if desired, the date) at which the message 324 was sent by the designated sender.

It will be appreciated that other information or attributes may be included in the message 324, such as a subject field (not shown) to enable a subject for part or all of the conversation to be transported with the message 324 (e.g. to create new subjects, modify subjects, notify others of subjects, etc.). Although not shown in FIG. 10, one or more tags can also be used to indicate to the instant messaging application 54, upon receipt of a message 324, that the message 324 has certain attributes such as a subject that is to be displayed, whether additional information is being transported (i.e. data or information in addition to the message content), or whether the message 324 is being used for some other purpose such as provisioning, synchronization, etc. As explained below, such additional information may relate to an invitation to add a contact to the contact list 62.

In general, in a PIN based messaging protocol 314, the sender of the message 324 knows the PIN 307 of the intended recipient. This is preferably established when the two devices request to add each other to their respective contact or "buddy" lists. At the time of requesting new contacts, in traditional PIN-to-PIN protocols 314, the two respective PIN numbers 307 are exchanged via request e-mails which are configured to be intercepted by the respective instant messaging applications 54 so as to not appear in the message list or "inbox" of the user. As noted above, it has been recognized that to avoid the exchange of email messages to add a contact to the contact list 62, the GAL application 294 may instead be accessed in order to obtain the PIN 307 for the intended recipient directly. This enables users to add contacts within their own organization automatically. Since the sender and the recipient are both part of the same organization, there is an implied level of trust that allows for automatic contact list additions that are more efficient and avoid the above-mentioned email exchange. Also, by accessing the GAL application 294, the sender's instant messaging application 54 can determine whether or not the intended recipient is a mobile device user thus avoiding an invitation to a user that does not have the capability to participate in a mobile instant messaging session. It can be seen in the example shown in FIG. 10 that mobile device A 100A can communicate directly with mobile device B 100B through the peer-to-peer messaging server 312 as indicated by the short-dashed line and each mobile device 100A, 100B can access the same GAL application 294 through the contact server 276 provided by the host system 250 as indicated by the long-dashed lines.

When conducting an instant messaging session according to the embodiment shown in FIG. 10, the mobile devices 100A, 100B can communicate directly with the wireless router 26 in a client based exchange where, similar to other peer-to-peer programs, an intermediate server is not required. A message 324 sent by one mobile device 100 is received by the wireless router 26, which obtains the PIN number for the intended recipient from a representation of the message 324 or from the message 324 itself Upon obtaining the recipient's PIN 307 according to the PIN-to-PIN protocol 314, the wireless router 26 then prepares a copy of the message 324 or relays the received message 324 to the recipient according to the mobile device 100 associated with such PIN 307. The wireless router 26 typically also provides a delivery confirmation to the original sender, which may or may not be displayed to the user. The wireless router 26 also typically holds onto messages 324 and delivers them once the destination mobile device 100 is within a certain range (e.g. within its 'coverage') and is actually able to receive the message 324. The wireless router 26 may choose to expire a message 324 if a certain waiting period lapses.

It will be appreciated that, as noted above, instant messaging can be implemented using any other suitable protocol such as SMS. In SMS, a message is transmitted to an SMC center (SMSC) within a carrier's infrastructure, and then delivered to the destination device. The SMSC would also be configured to hold onto messages and deliver then once the destination device is within coverage.

Figure 11:
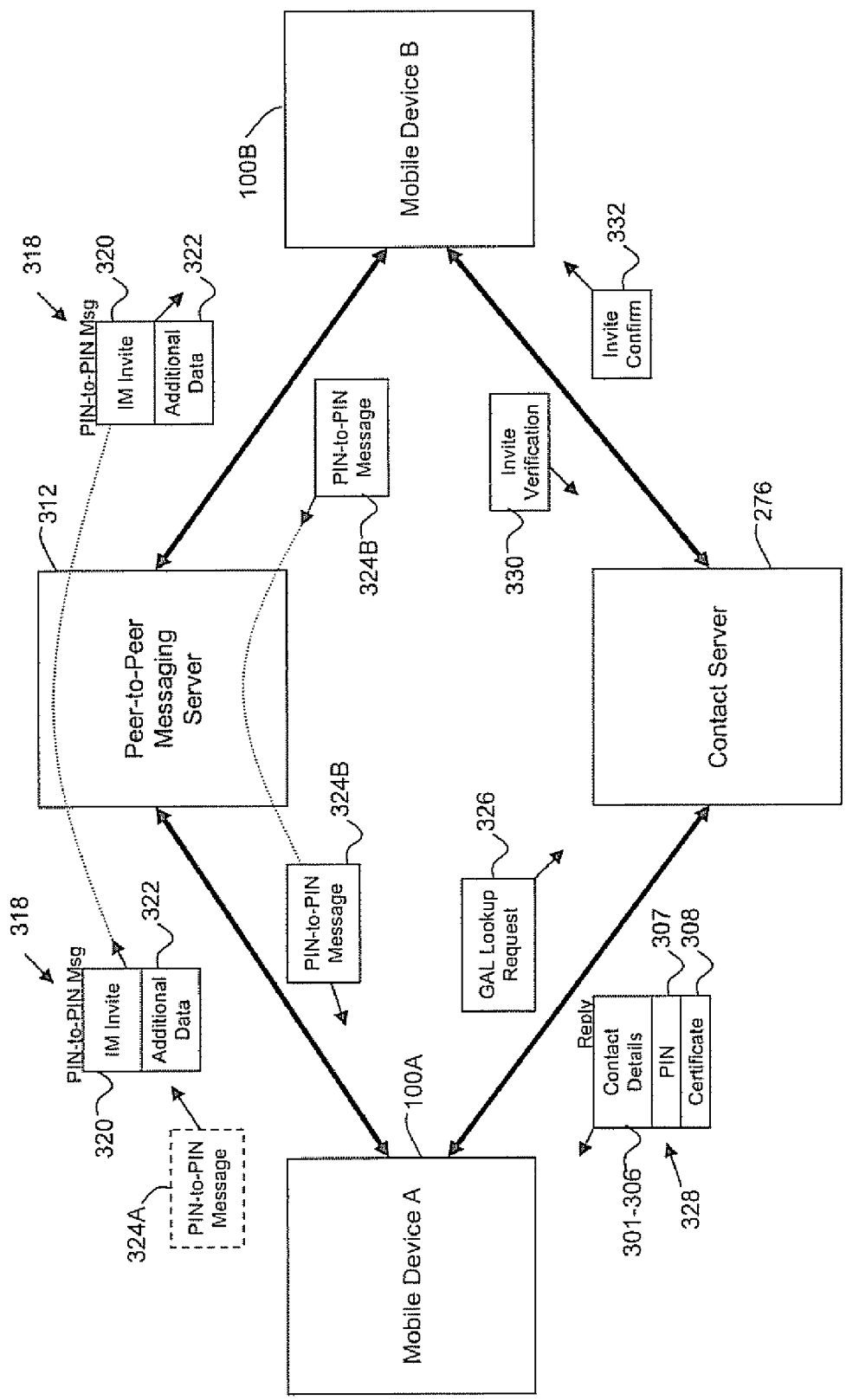
FIG. 11 is a system diagram illustrating data flow in the configuration shown in FIG. 10 for sending an instant messaging invitation.

Turning now to FIG. 11, a simplified system diagram is shown that illustrates various message and data exchanges performed during the addition of a contact to the contact list 62 using access to the GAL 298. An IM invite message 318 may be sent by mobile device A 100A, through the peer-to-peer messaging server 312, to mobile device B 100B. The invite message 318 comprises an invitation 320 to mobile device B 100B to have them added to mobile device A's contact list 62. The invite message 318 also, in this embodiment, comprises additional data 322 appended to the invitation 320. As will be explained below, in order to generate the invite message 318, mobile device A 100A accesses the GAL 298 through the contact server 276 and obtains the PIN 307 for mobile device B 100B. Since the PIN 307 for mobile device B 100B is already known, mobile device A 100A can immediately follow the invite message 318 with the first PIN-to-PIN message 324A in a new conversation as shown in dashed lines.

In order to obtain the PIN 307 for mobile device B 100B, a GAL lookup request 326 can first be sent to the GAL application 294 at the contact server 276, which includes at least one piece of information that identifies the desired GAL member, such as the first few letters of the user's name. Upon receipt, the GAL application 394 can access the data store 296, search for the corresponding member entry 300 using information provided in the GAL lookup request 326. A reply 328 may then be prepared that either indicates that no match could be found or includes search result information as shown in FIG. 11. The reply 328 shown in FIG. 11 includes contact details 301-306 for the one or more matches for the information provided in the request 326, the corresponding PIN 307 for each match and, if applicable, the corresponding certificate 308 for each match to enable subsequent messages 324A to be encrypted. It can be seen that by accessing the GAL 298, not only can contact details 301-306 be obtained but also certificates 308 that enable instant messaging traffic to be encrypted and enables any communication coming from that particular user to be authenticated. In other words, the GAL lookup mechanism provided herein for adding contacts also creates a convenient certificate distribution channel so that certificates 308 can be used to also increase the security of instant messaging traffic.

Mobile device B 100B, upon receipt of the invite message 318, processes the invitation according to the nature of the invitation 320 and the additional data 322 (if sent). Thereafter, mobile device B 100B may send PIN-to-PIN messages 324B to mobile device A 100A since the message 318, having the structure shown in FIG. 10, would also include the source address 71 for mobile device A 100A. Optionally, mobile device B 100B, before adding mobile device A 100A to their contact list, may wish to verify that the incoming invite message 318 is indeed from a legitimate member of Organization X. This can be done either automatically and transparent to user B, or may be initiated or controlled or both by user B. In either case, mobile device B 100B may send an invite verification 330 to the GAL application 294 at the contact server 276, indicating that user B has received an invitation to user A having mobile device A 100A and user B wishes to confirm that user A is part of Organization X. An invite confirm 332 is then returned to confirm (or deny) that user A is part of Organization X. This mechanism can be used to avoid adversaries sending random invitations to random PIN addresses in an attempt to obtain sensitive information from the recipient. However, it will be appreciated that by protecting the PIN 307 for each member in the GAL 298 (at the contact server 276 and within the host system 250), when receiving an invite message 318, it can be assumed with at least some certainty that the invite message 318 is legitimate, i.e. comes from a "trusted source". Also, if the invite message 318 is digitally signed using the certificate 308 retrieved from the GAL 298, the sender of the invite message 318 can be authenticated on the basis of the digital signature thus avoiding the above-described invite confirmation procedure. As such, it will be appreciated that the exchange of an invite verification 330 and invite confirm 332 is purely optional.

Figure 12:
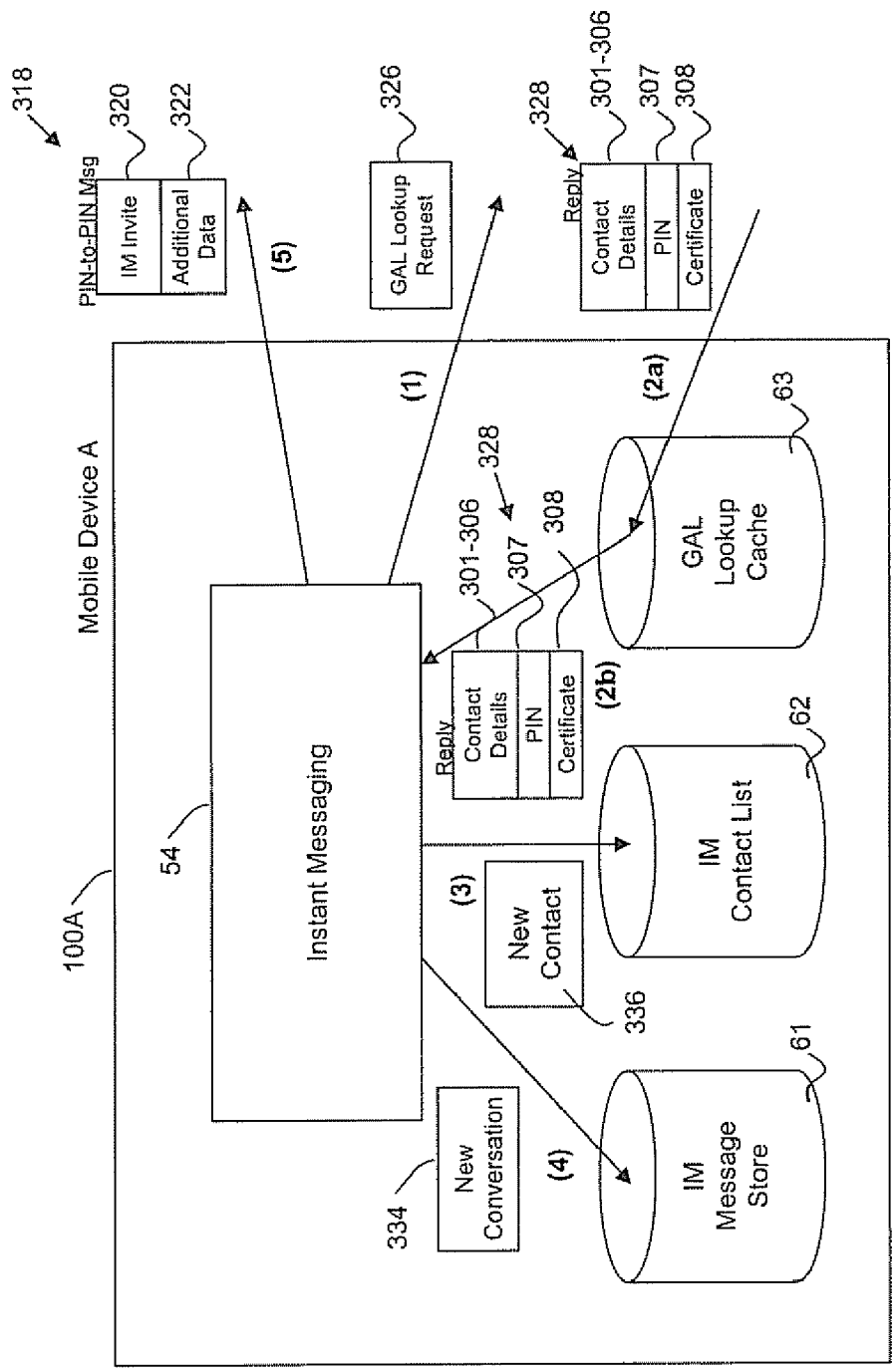
FIG. 12 is a system diagram showing further detail of mobile device A of FIG. 11.

Further detail of how the instant messaging application 54 generates the invite message 318, and other operations that may occur upon generation of the invite message 318, are shown in FIG. 12. First, the instant messaging application 54 sends the GAL lookup request 326 at (1) as noted above. As will be exemplified below, the request 326 is initiated by the user. The reply 328 is then received at (2*a*), the content of which is temporarily stored for later access by the GAL lookup cache 63 and then passed to the instant messaging application 54 at (2*b*). The GAL lookup cache 63 can therefore store the results of a search for a particular contact and such results can later be used by any program, e.g. the message application 138 for addressing an email. It is assumed in this example that user A has configured their instant messaging application 54 or the instant messaging application 54 is otherwise set to automatically and temporarily add the invitee as a new contact 336 to the IM contact list 62 at (3) and start a new conversation 334 at (4). This can be done so that upon initiating the invitation 320, user A may begin to send instant messages immediately and thus begin a conversation immediately with user B. It will be appreciated that (3) and (4) may instead not be automatic and thus be independent of the invitation procedure. The invite message 318 is then generated at (5) using the reply 328 and user feedback regarding the content of the invitation 320, and by appending any additional data 322. If user A has configured the instant messaging application 54 to automatically generate a new conversation 334, the additional data 322 may include the first message 324A or, a separate message 324A may immediately follow the invite message 318 as shown in FIG. 11.

Figure 13:
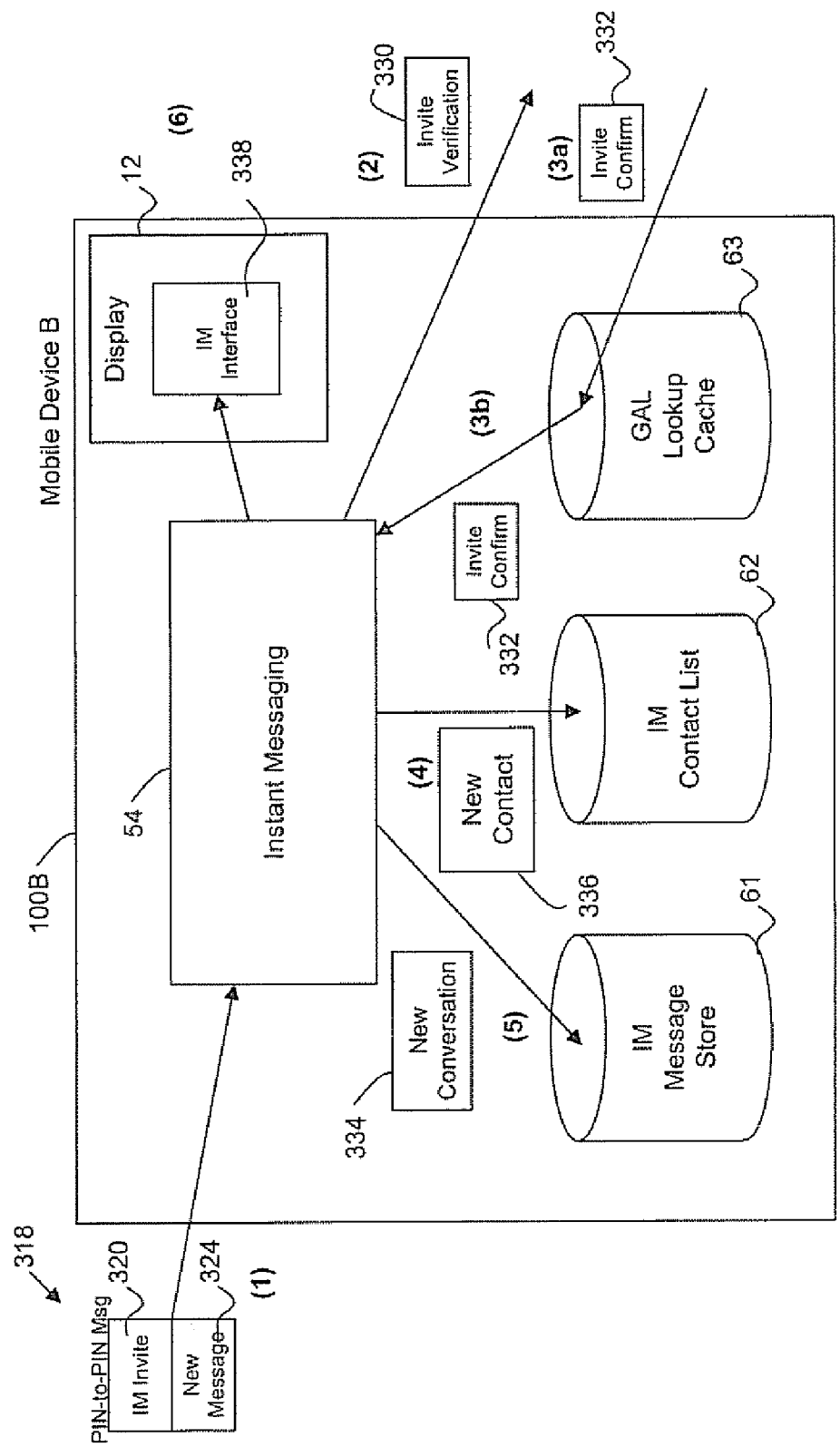
FIG. 13 is a system diagram showing further detail of mobile device B of FIG. 11 in one embodiment.

Turning now to FIG. 13, assuming that mobile device B 100B is running the same instant messaging application 54 as mobile device A 100A, the processing of the invite message 328 by mobile device B 100B is exemplified. In this example, it is also assumed that the additional data 322 is a new message 324A. First, the instant messaging application 54 receives or otherwise obtains the invite message 318 at (1). It will be assumed in this example that user B has configured the instant messaging application 54 or the instant messaging application 54 is programmed to automatically request verification of the invitation message 318 before processing the request. At (2), the instant messaging application 54 sends the invite verification 330 to the GAL application 294 and then receives the invite confirm 332 at (3*a*). Preferably, the GAL look-up cache 63 first temporarily stores the invite confirm 332 for future reference if need be and then passes the invite confirm to the instant messaging application at (3*b*). Again, if an automatic addition is preferred by user B, a new contact 336 added at (4), a new conversation 334 may be initiated at (5), and an IM interface 338 displayed at (6). The IM interface 338 can first display an invitation message and then load the new conversation 334 and thus the new message 324A can display the invitation 320 and content of the new message 324A at the same time or may simply open the N application UI (see FIG. 15(*a*) described below). It can therefore be seen that in one embodiment, user B can be immediately and automatically added as a contact, and a new conversation immediately initiated since through the GAL lookup operation, mobile device A 100A has already obtained the PIN 307 for mobile device B 100B. It will be appreciated that any of the operations illustrated in FIGS. 12 and 13 can be used automatically or require as much or as little user interaction as dictated by the user or by the configuration of instant messaging application 54.

Figure 14B:
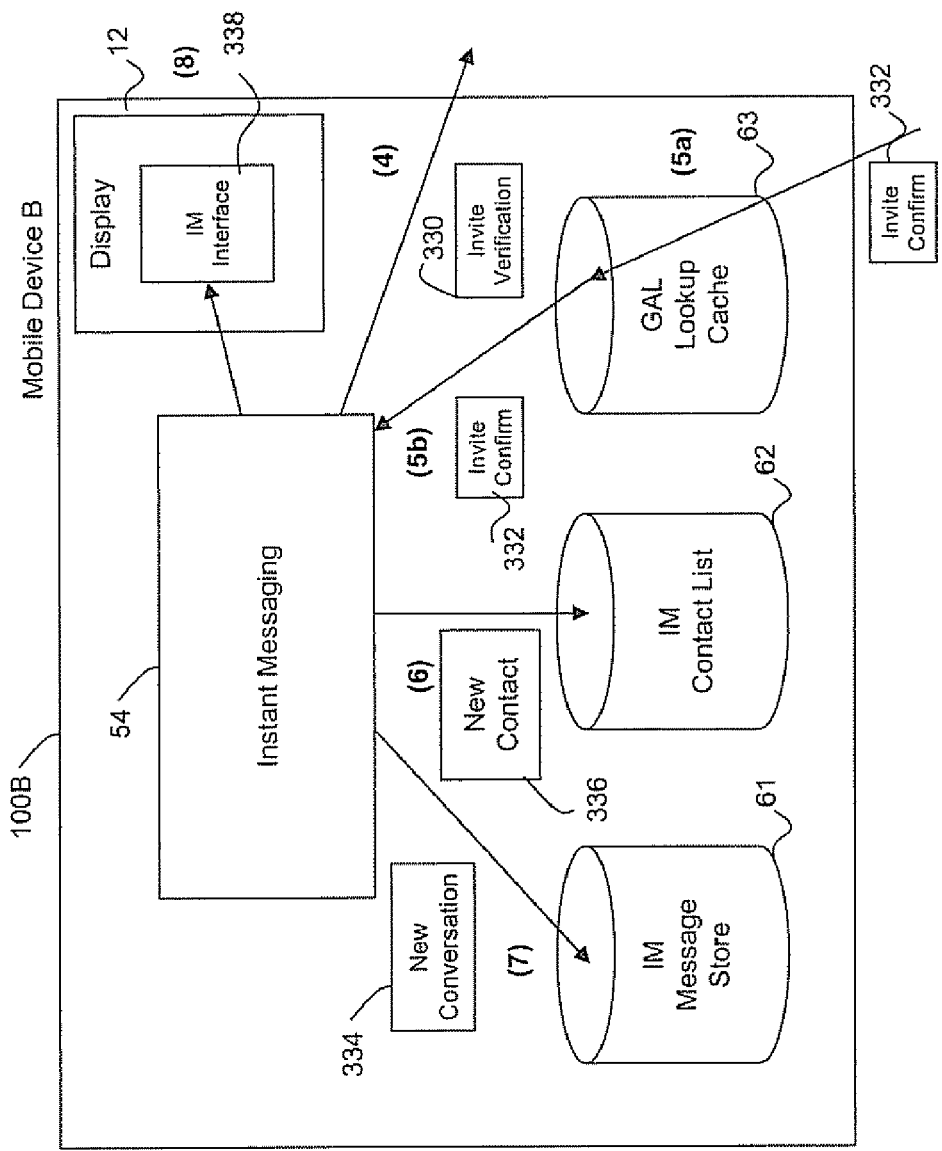
FIGS. 14(a) and 14(b) are system diagrams showing further detail of mobile device B of FIG. 11 in another embodiment.
Figure 14A:
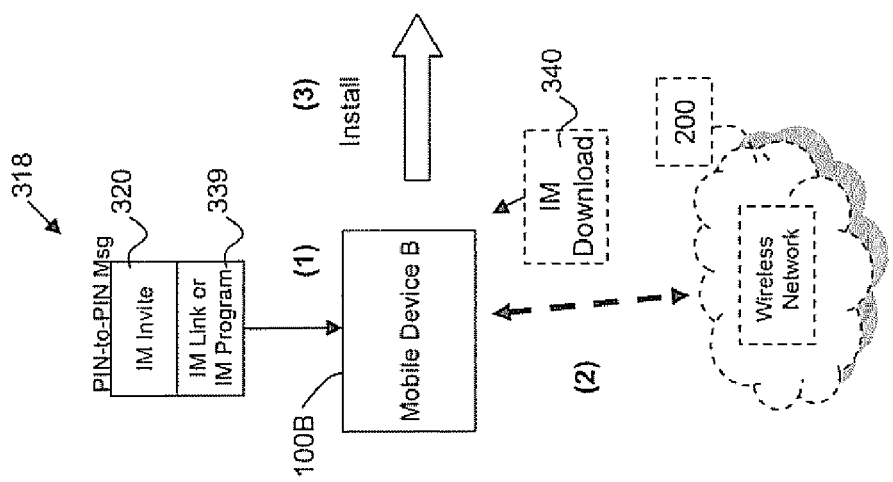

Although the mobile device 100 preferably has the instant messaging application 54 pre-installed, user B may not have the instant messaging application 54, in which case, user B would need to obtain and install the instant messaging application 54 before being able to fully process the incoming invite message 318. Another example, where mobile device B 100B, at the time of receiving the invite message 318 does not have the instant messaging application 54, is shown in FIGS. 14(*a*) and 14(*b*). In this example, the additional data 322 is an IM link or IM program, collectively shown as 339. The IM link may be a hyperlink to an appropriate website for downloading the IM application 54 at (2) or may be used to obtain more information about the instant messaging application 54. In addition to or rather than a link, an executable file, i.e. the instant messaging application 54 itself can be transported with the invite message 318 so that, if appropriate, user B can install the instant messaging application 54 at (3). It will be appreciated that the choice of whether to send a link or the entire program can be dependent on bandwidth limits, user preferences and can be controlled by the instant messaging application 54 at mobile device A 100A. The instant messaging application 54 may determine whether or not mobile device B is running the same instant messaging application 54 prior to sending the invite message 318, e.g. by obtaining such information through the GAL lookup request 326, or may simply send the IM link or IM program or both 339 for every invite message 318 sent and allow user B to install at (3) if necessary. For the sake of clarity, in this example, it will be assumed that both the IM link and IM program 339 are sent giving user B the choice of whether to install immediately or download 340 the IM application 54 through the IM link. Once the instant messaging application 54 is installed, it can be seen that operations (4) through (8) in FIG. 14(*b*) are the same as operations (2) through (6) shown in FIG. 13.

Turning now to FIGS. 15(*a*) to 15(*h*), an example IM interface 338 for the instant messaging application 54 is shown. FIG. 15(*a*) shows the main IM UI screen 342 that includes a first list 344 of user A's current conversations and a second list 346 of user A's contacts. It can be seen in FIG. 15(*a*) that user A has no current conversations and has three contacts in the second list 346, namely User D, User P and User X. In the following examples, the identifier "User" followed by a character, e.g. "D" indicates a contact associated with Organization X. To add a new contact, user A initiates an instant messaging menu 348 from within the UI screen 342, e.g. by selecting the menu button 24. A list of options are included in the menu 348, including an "Add a New Contact . . . " option 350 which, when highlighted and selected as shown in FIG. 15(*b*), loads a contact selection screen 352 as shown in FIG. 15(c). The contact selection screen 352 provides an interface for user A to enter, lookup or select an contact to be added, information pertaining to which may or may not be stored on mobile device A 100A. As such, several mechanisms are typically provided for obtaining the requisite information pertaining to the desired contact, in this example, user B. A "[Use Once/Lookup]" function 354 is provided, which may be highlighted and selected by user A as shown in FIG. 15(c) or may be automatically selected upon sensing character entries made by user A. Also shown is a recent search result 356 for a specific entry, in this case "und". The recent search result 356 is preferably obtained from the GAL lookup cache 63 so that recently obtained data, if applicable to the current operation, can be used rather than preparing an entirely new GAL lookup request 326. Also shown in FIG. 15(c) is a list of locally stored contacts 358. The locally stored contacts 358 may be other users from Organization X or may be other contacts added by user A at any previous time.

Figure 15C:
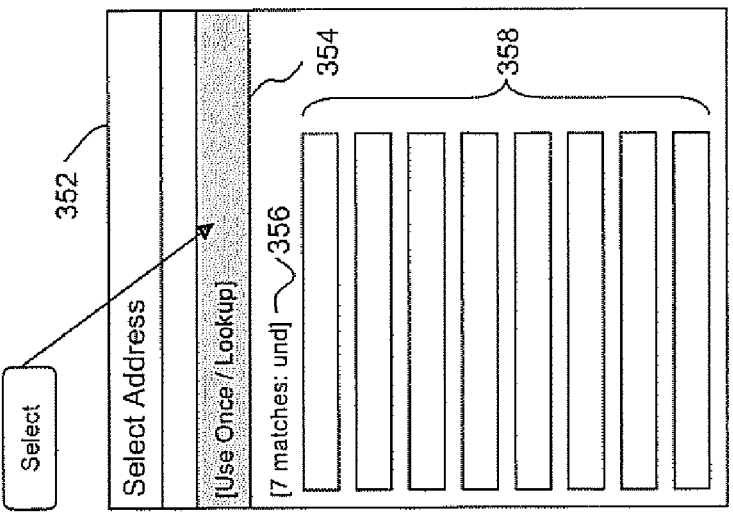
Figure 15B:
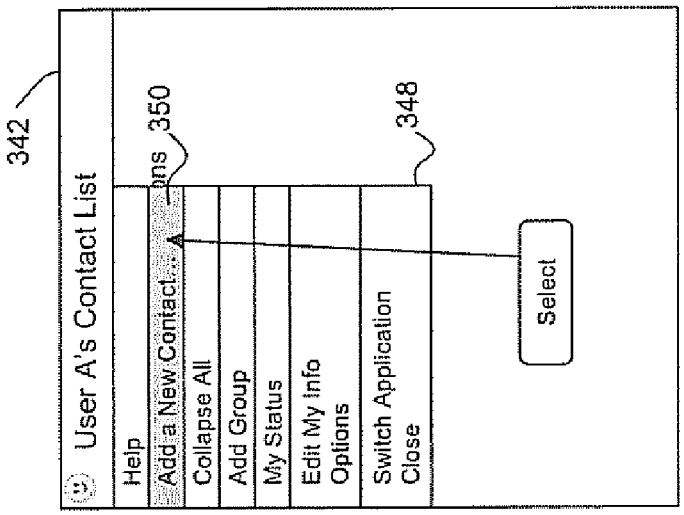
Figure 15A:
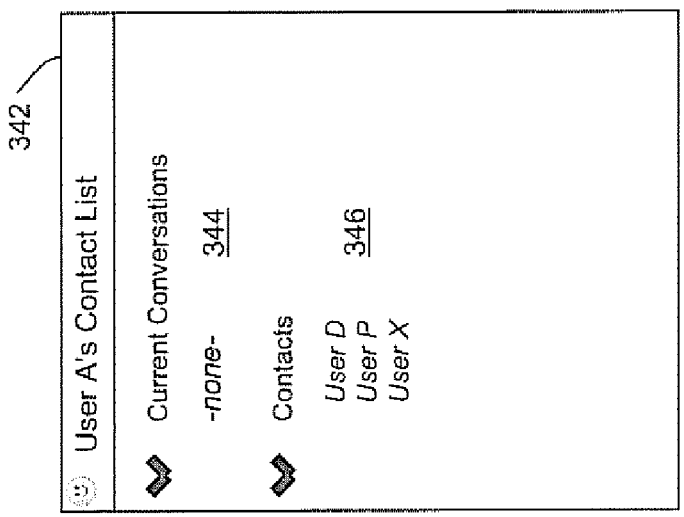
Figure 15D:
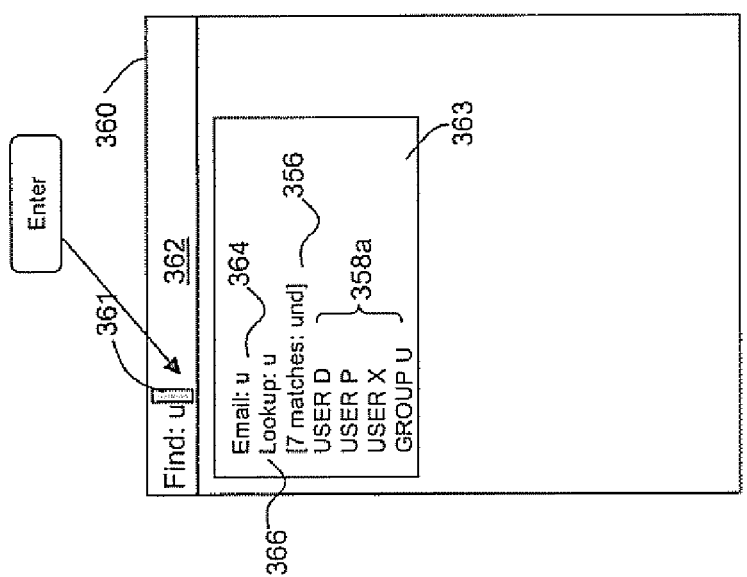
Figure 15E:
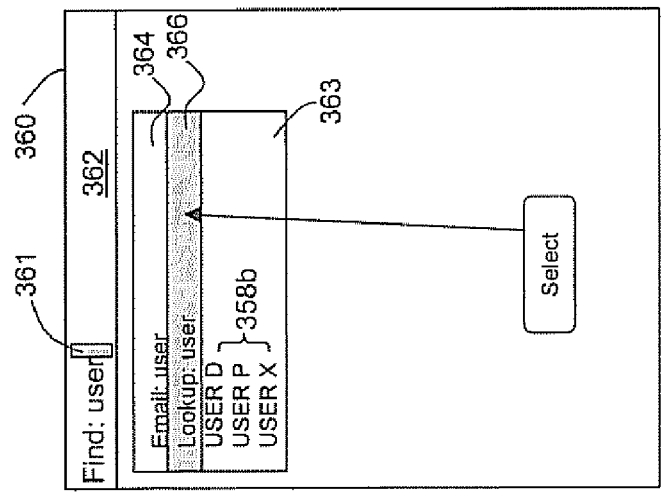
Figure 15F:
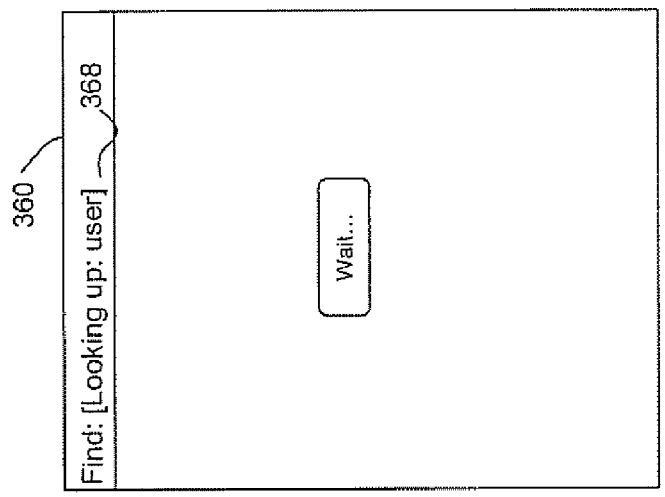

Upon selection of the function 354 or by beginning to enter search characters, a find screen 360 is then loaded by the instant messaging application 54 as shown in FIG. 15(d). The find screen 360 includes an entry portion 362 that displays the characters entered by user A aid a cursor 361 emphasizing that the entry portion 362 is being used. The find screen 360 also includes an initial results window 363, which contains any locally stored matches to the characters already entered in the entry portion 362. In FIG. 15(d) only a "u" has been entered and, therefore, the recent results 356 for "und" remains in the initial results window 363, as well as a filtered list 358a of the locally stored contact list 358, which in this example includes User D, User P, User X and Group U. Also included in the initial results window 363 is an initial email entry 364 and an initial lookup entry 366. The initial email entry 364 is an email address that would be used in a traditional email-based invitation, e.g. when the invitee is not part of Organization X or the PIN 307 for the invitee is otherwise unknown to mobile device A 100A. If the email entry 364 is selected, the characters entered by user A are taken as an email address and the traditional email invitation sent. The initial lookup entry 366 provides feedback to user A indicating the search string that will be sent in the GAL lookup request 326, if the initial lookup entry 366 is selected as shown in FIG. 15(e). In FIG. 15(e) it can be seen that to narrow the search, user A has continued to enter "u-s-e-r", which further filters the initial results window 363. It can be seen that by entering "user", user A has disregarded the results 356 for "und" and the locally stored Group U. Since user B is not in the further filtered list 358b of local contacts, user A selects the lookup entry 366, which loads a lookup status 368 and clears the initial results window 363 as shown in FIG. 15(f) to indicate that the GAL lookup request 326 has been sent and the instant messaging application 54 is currently waiting for the reply 328.

Once the reply 328 is received, a lookup results screen 369 is loaded as shown in FIG. 15(g), which indicates how many matches are included in the lookup results 370, displayed within the screen 369. It will be appreciated that preferably, the complete set of contact details 301-306, PIN 307 and certificate 308 for each match is temporarily stored in the GAL lookup cache 63 until a selection is made by user A. It can be seen that user B is included in the lookup results 370 and thus by selecting "User B", user A can initiate the invitation process. Turning now to FIG. 15(h), upon selecting "User B", an invitation message window 371 is displayed within the UI screen 342, which allows user A to customize the invitation content if desired. The window 371 includes a default message 375, which can be modified or a new message pasted thereinto by selected a "Paste" button 374. Additional information such as the text shown in FIG. 15(h) indicating that "User B is a mobile device subscriber", can also be provided when available, to assist User A in customizing their message 375 or to determine whether to discard the entire invitation by selecting a "Cancel" button 373. For example, if user B is not a mobile device subscriber, there may be no point in trying to add them as a contact since they would naturally not have the ability to participate in a mobile instant messaging session. It will be appreciated that where the instant messaging application 54 can be used on both mobile devices 100 and non-mobile devices such as desktop computers, this information may not be as relevant.

By selecting an "OK" button 372 as shown in FIG. 15(h), the invite message 318 is generated and sent to User B.

It may be appreciated that the screenshots shown in FIGS. 15(a) through 15(h) are for illustrative purposes only and various other UI mechanisms may be employed. For example, referring now to FIG. 16, the find screen 360 shown in FIGS. 15(d)-15(f) may instead be implemented within an lookup entry box 360a that is displayed automatically within the UI screen 342. It may be seen in FIG. 16 that rather than switching to new screens as illustrated in FIGS. 15(c) and 15(d), the lookup entry box 360a can be initiated upon sensing characters being entered by the user, which in turn initiates the initial results window 363 as before. It will be appreciated that the other operations, such as those shown in FIGS. 15(a) to 15(b) and 15(g) to 15(h) may be utilized in a similar way with the entry box 360a shown in FIG. 16.

Figures 17A, 17B, 17C:
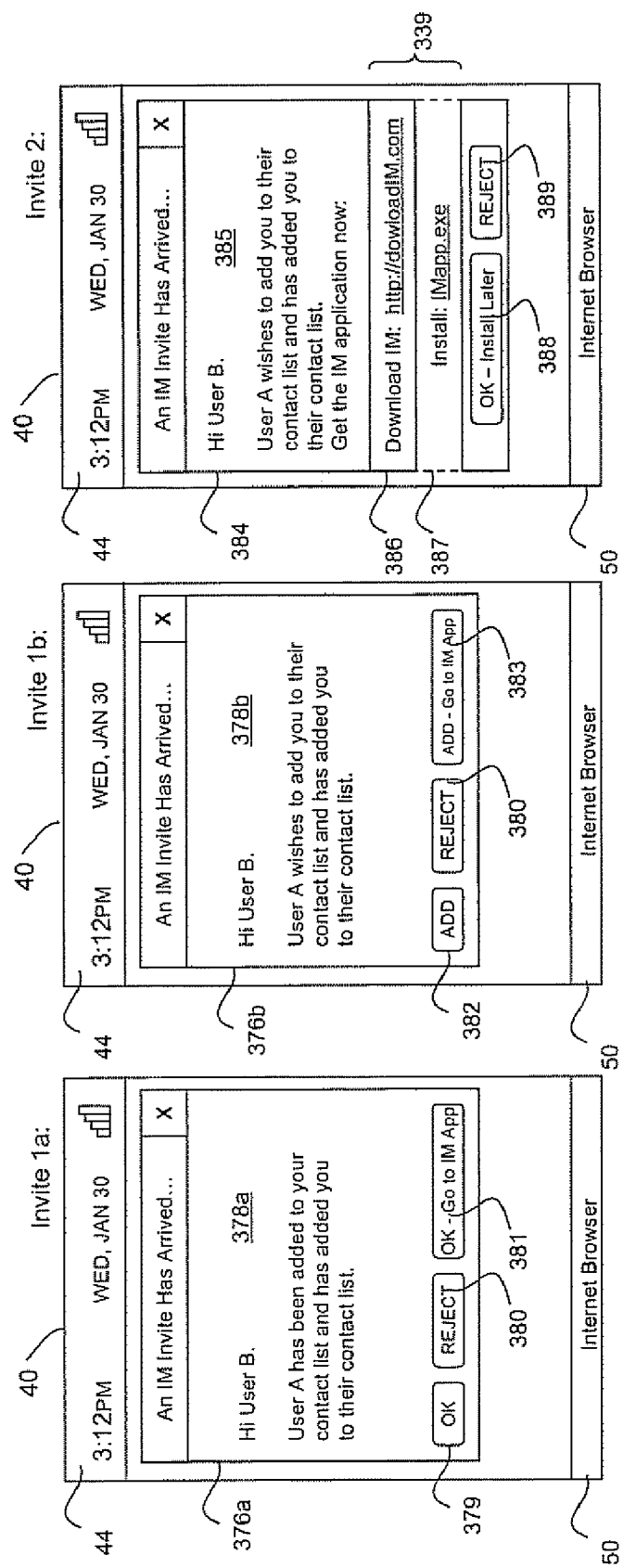
FIG. 17(a) is a screen shot showing an invitation received by mobile device B in the embodiment shown in FIG. 13.
FIG. 17(b) is a screen shot showing another invitation received by mobile device B in the embodiment shown in FIG. 13.
FIG. 17(c) is a screen shot showing an invitation received by mobile device B in the embodiment shown in FIGS. 14(a) to 14(b).

Turning now to FIGS. 17(a) to 17(c), various example invitations that may be received by user B are shown. FIG. 17(a) illustrates a first invitation message 376a, also denoted by "Invite 1a", where User B permits automatic contact addition for users within Organization X and thus members of the GAL 298. FIG. 17(b) illustrates a second invitation message 376b, also denoted by "Invite 1b", where user B does not permit automatic addition at their end but rather wishes to receive a request and have the option to deny or reject the message. FIG. 17(c) illustrates another, third invitation message 384, where user B does not already have the instant messaging application 54 installed, also denoted by "Invite 2". Preferably, mobile device B 100B first processes the incoming invite message 318 and determines which of the invitation messages 376a-c is most appropriate. Alternatively, the most appropriate invitation message 376a-c may be determined at mobile device A 100A, either by user input or from information contained in the GAL 298.

Turning first to FIG. 17(a), the first invite message 376a, namely Invite 1a is received by user B and displayed within the homescreen 40 in this example. The invite message 376a includes a textual invitation 378a that indicates that User A has been added to User B's contact list 62 and user B has been added to user A's contact list 62. An "OK" button 379 may be selected to accept the already applied addition, a "Reject" button 380 may be selected to reverse or reject the automatic addition, or an "OK—Go to IM App" button 381 selected to accept the addition and immediately access the IM UI screen 342 to view any new messages or to view further details. Invite 1b shown in FIG. 17(b) is similar to Invite 1a shown in FIG. 17(a) but the textual invitation 378b requests that the addition take place rather than notify user B of an automatic addition. An "Add" button 382 may be selected by user B to accept and add User A as a contact (and vice versa), the reject button 380 selected as discussed above, or an "Add—Go to IM App" button 383 to add user A and then immediately load the UI screen 342 as above.

Turning now to FIG. 17(c), when it has been determined that user B does not have the instant messaging application 54 or if by default all additional information 322 is sent with each invite message 318, the invite message 384 is displayed to user B. Similar to Invite 1b, a textual invitation 385 indicates that user A wishes to add user B to their contact list 62. Also included is a hyperlink 386 to an appropriate download page that can be accessed through the Internet browser 56, or an installation link 387 to immediately begin installation of the instant messaging application 54 upon selection. Collectively, as noted above, the hyperlink 386 or installation link 387 or both may be referred to by numeral 339 shown in FIG. 14(a) as an embodiment of the additional info 322. User B may select an "OK—Install Later" button 388 when they do not wish to begin the installation process right away, or a "Reject" button 389 to reject the addition as above. When user B selects button 388, a periodic reminder may be initiated or a message added to any message list on mobile device B 100B for later access. It may be noted that the invite message 318 would not be considered properly accepted in the example shown in FIG. 17(c) since the recipient in this example does not have the instant messaging application 54. An invitation rejection message (not shown) may be used to notify the sender that the recipient does not have the instant messaging application installed 54.

It can be seen that by using the GAL lookup request 326 prior to generating an invitation to add a new contact, the invitation can be sent as a PIN-to-PIN message 324 using the PIN-to-PIN protocol 314 therefore avoiding the additional email exchange as is traditionally done. Also, since other members of the GAL list 298 are presumed to be part of a trusted group, e.g. all part of Organization X, more flexibility can be achieved in utilizing automatic additions and for immediately initiating the first conversation.

Figure 18:
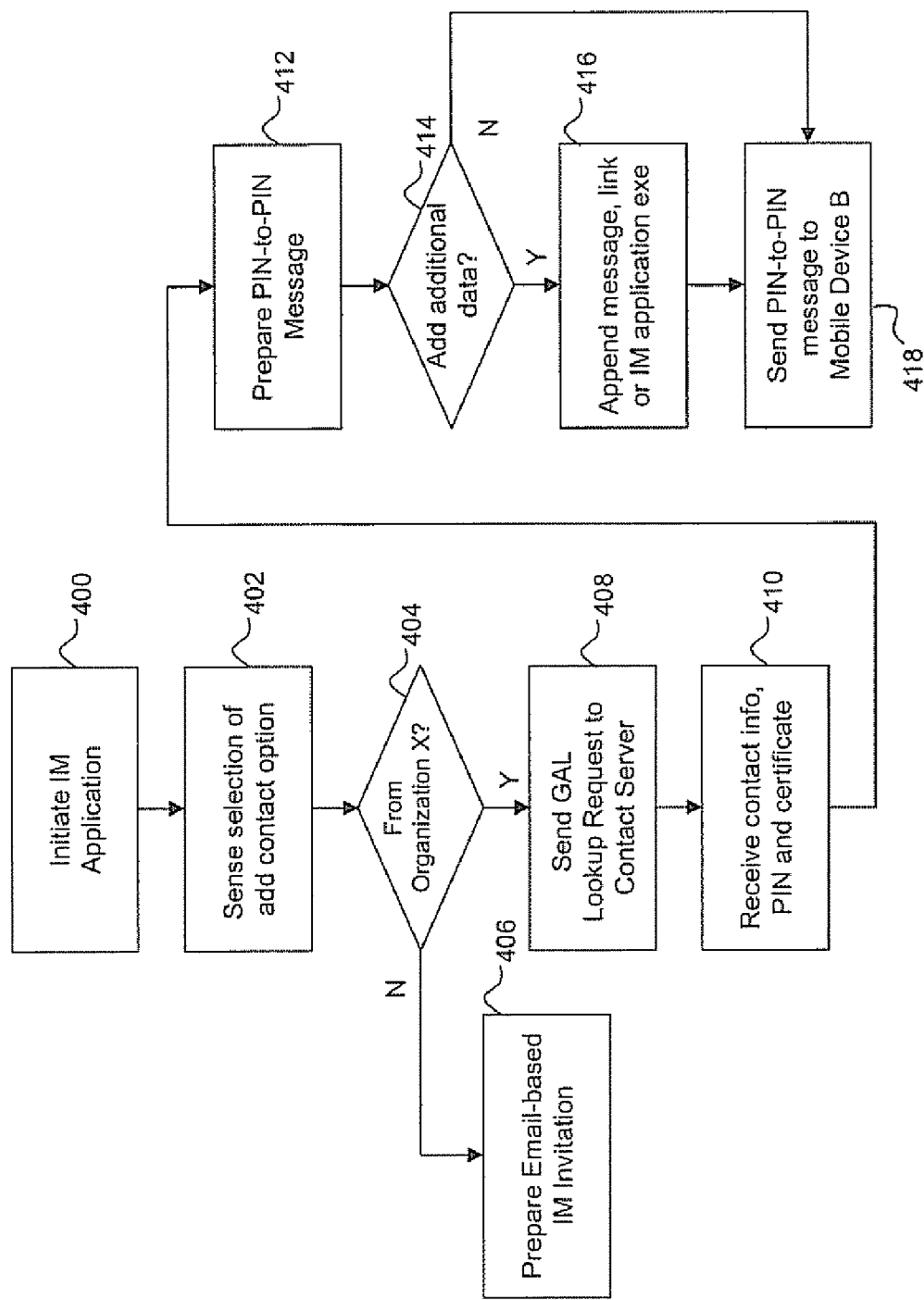
FIG. 18 is a flow diagram illustrating a sequence of operations for adding a contact in an instant messaging application.

Turning now to FIG. 18, a flowchart is shown depicting a set of computer readable instructions executed by the instant messaging application 54 in generating the invite message 318. At 400, the instant messaging application 54 is initiated, e.g. by user A as exemplified above. At 402, the instant messaging application 54 senses the selection of the add a new contact option 350 by user A, which is accessed by first launching the instant messaging window 348 as shown in FIG. 15(b). At 404, the instant messaging application 54 then determines if the invitee as selected or entered by user A is from Organization X, i.e. can the PIN 307 be obtained directly through the GAL 298. If not, a traditional email-based invitation is prepared at 406. For example, if user A enters a complete email entry 364, which is selected and is determined to not be associated with Organization X, operation 406 would be required. If the invitee is determined to be from Organization X, which is implied if User A selects the look-up entry 366 or selects an appropriate contact from the filtered list of contacts 358a, 358b, the GAL lookup request 326 is sent to the contact server 276 at 408. The GAL application 294 then generates an appropriate reply 328 which includes the contact details 301-306, PIN 307 and certificate 308 for each match and sends back to User A, which is then received at 410. The PIN-to-PIN invite message 318 is then prepared at 412 which includes obtaining feedback from User A regarding the form and content of the invitation message 320 as shown in FIG. 15(h). The instant messaging application 54 then determines at 414 if any additional data 322 should be added. If so, the first message 324A, the links 339 etc. are added at 416. If not, or once the additional information has been added at 416, the invite message 318 is then sent to mobile device B 100B at 418. It will be appreciated that at 416, by virtue of having access to the certificate 308 as a result of the GAL lookup request 326, the invite message 318, and any subsequent message 324, can be encrypted for additional security, even though the messages 318, 324 are sent to each other directly outside of Organization X's firewall 266.

Figure 19:
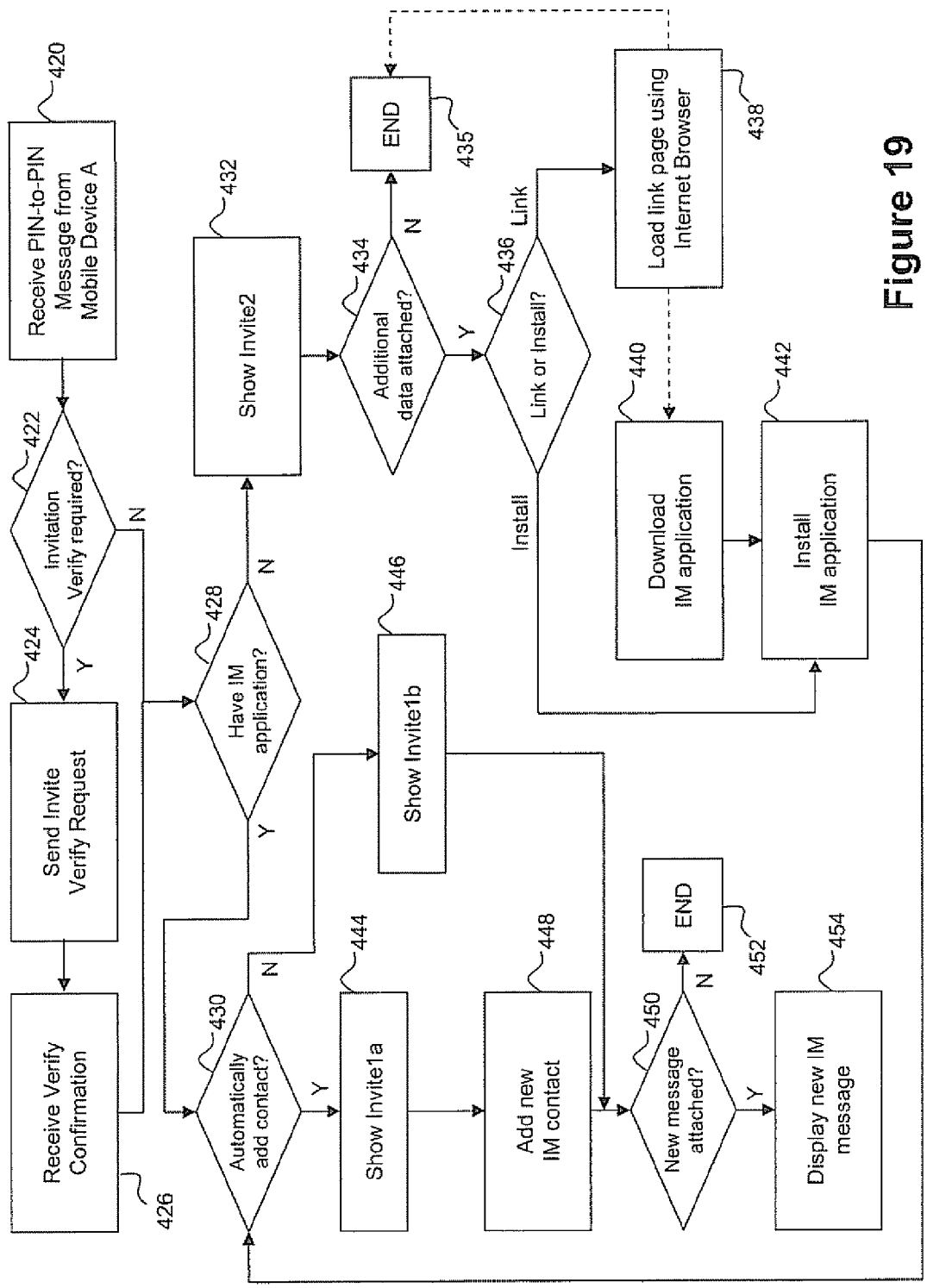
FIG. 19 is a flow diagram illustrating a sequence of operations for handling a received invitation to be added to a contact list.

FIG. 19 illustrates a flow chart depicting computer readable instructions executed by the instant messaging application 54 for processing an incoming invite message 318. In this example, an invite message 318 is received at 420. The mobile device 100 then determines at 422 if verification of the invitation 320 is required. This may be done by referencing user preferences or by utilizing a default setting etc. If verification of the invitation 320 is required, an invite verification 330 is prepared and sent to the GAL application 294 at 424 and the mobile device 100, if necessary, waits for receipt of an invite confirm 332, which is received at 426. If the verification of the invitation 320 is not required or following receipt of the invite confirm 332, the mobile device 100 then determines if the instant messaging application 54 (or current version thereof) has been installed at 428. If the instant messaging application 54 has been installed, the instant messaging application 54 is then launched and determines at 430 if a new contact should be automatically added. If the instant messaging application has not been installed, Invite 2 shown in FIG. 17(c) may be displayed at 432, which provides at least some information to assist the user in obtaining the instant messaging application 54 and may even provide a copy for installation.

When Invite 2 is displayed, the mobile device 100 then examines the invite message 318 and determines if there is any additional data 322 attached. If not, the invitation message 320 would be displayed until the user chooses to close the window or a predetermined period of time elapses or any other criteria. When there is no additional data 322, the user would need to obtain the instant messaging application 54 at some other time and the process then ends at 435. It may be noted that the mobile device 100 can cache the invite message 318 so that if the user does install the instant messaging application 54 at a later time, the invitation process shown in FIG. 18 can proceed onward from 434. As exemplified above, the additional data 322 is preferably one or more links 339, which may include a hyperlink 386 or an install link 387 or both. The mobile device 100 would then sense a selection from the user at 436, should they decide to obtain the instant messaging application 54, namely either "Install" or "Link" shown in FIG. 19. If the hyperlink 386 is chosen, a webpage may be loaded using the Internet browser 56 at 438 to enable the user to obtain more information and download the application. The dashed lines in FIG. 19 indicates that the user may download the instant messaging application 54 at 440 but may also simply close down the Internet browser 56 and end the process at 435.

If the "Install" option is chosen or once the instant messaging application 54 has been downloaded, the instant messaging application may be installed at 442. Once installed, the instant messaging application 54, once initiated, then determines if the contact associated with the invite message 318 should be automatically added at 430.

If the contact is automatically added, Invite 1a, shown in FIG. 17(a), may be displayed at 444 to notify the user that the contact has been added and that they have been added to the sender's contact list. The new contact would then be added at 448. If the contact is not to be automatically added, Invite 1b may be displayed at 446 to notify the user that the sender wishes to add them to their contact list and vice versa. Once the invitation 320 has been displayed, in whatever form, and the new contact added if appropriate, the instant messaging application 54 then determines if there is a new instant message 324 as part of the additional information 322 or if a new message 324 has since been sent (e.g. as shown in FIG. 11). If no additional messages are found, the process ends at 452. If a new message 324 is found, the instant messaging application then loads the IM interface 338 and displays the new message 324 at 454.

It has been recognized that in systems where a mobile device 100 has access to information pertaining to another mobile device 100, the other mobile device 100 can be communicated with directly by an instant messaging application to initiate an instant messaging session, in particular to add a new contact and immediately begin such instant messaging session, without requiring an initial email exchange. In this way, new contacts can be added automatically by obtaining addressing information, and access to other data such as public key certificates 308 enables the instant messages to be protected. The information is, in one embodiment available through a contact server 276 of a host system 250 common to both mobile devices thereby providing a trusted mechanism to establish the new contacts. For example, as described above, in a PIN-to-PIN based messaging system, a global address list (GAL) lookup can be incorporated into an option for adding a new contact so that the PIN 307 for the invitee is obtained directly and the invitation sent immediately in a PIN-to-PIN message 324 thus not requiring an email invitation. The other information available through the GAL lookup 326 can also enable the user to customize the invitation message and avoid sending invitations to members of the GAL 298 that do not have a mobile device 100.

It has also be recognized that by accessing the information for the other mobile device 100, instant messages 324 can be protected, even when outside of the host system's firewall 266, e.g. by using an available public key certificate 308 to encrypt instant messaging traffic. In this way, access to the information handled by the entity common to both mobile devices provides a distribution channel for using certificates to increase security and to obtain any other information that is made available.

It will be appreciated that the particular options, outcomes, applications, screen shots and icons shown in the figures and described above are for illustrative purposes only and many other variations can be used according to the principles described.

Although the above has been described with reference to certain specific embodiments, various modifications thereof will be apparent to those skilled in the art as outlined in the appended claims.

The invention claimed is:

1. A method for adding a new instant messaging contact to a contact list to enable instant messaging between a first mobile device and another mobile device associated with said new instant messaging contact, said instant messaging using personal identification numbers to enable instant messages to be sent between mobile devices, said method comprising:
providing a first option on said first mobile device for adding said new instant messaging contact without requiring an initial exchange with said other mobile device;
determining if said first mobile device and said new instant messaging contact are from a same organization; and
when said first mobile device and said new instant messaging contact are determined to be from said same organization:
upon sensing selection of said first option, enabling entry of one or more characters for identifying said new instant messaging contact;
providing a second option on said first mobile device for initiating a lookup using said one or more characters;
upon sensing selection of said second option, providing said one or more characters in performance of said lookup to a host system associated with said same organization;
obtaining from said host system, a result list for said lookup indicating each match to said one or more characters and including information pertaining to each match, said information for at least one match comprising a respective personal identification number for a corresponding mobile device;
if said new instant messaging contact is in said result list, enabling selection of said new instant messaging contact from said result list and obtaining said respective personal identification number for said corresponding mobile device after detecting selection thereof;
adding said new instant messaging contact to said contact list; and
sending an instant message directly to said new instant messaging contact via a personal identification number based messaging protocol using said respective personal identification number.

2. The method according to claim 1 wherein said host system comprises a contact server storing information pertaining to a plurality of mobile devices including said first mobile device and a second mobile device corresponding to said new instant messaging contact, said information comprising said data used to send said instant messages to a corresponding one of said plurality of mobile devices.

3. The method according to claim 1 wherein said respective personal identification number is used for addressing said instant message to said corresponding mobile device.

4. The method according to claim 3 wherein said respective personal identification number is unique to said corresponding mobile device, said respective personal identification number being used in a personal identification number to personal identification number messaging protocol for exchanging said instant messages.

5. The method according to claim 1 wherein said result list further comprises contact details pertaining to each match.

6. The method according to claim 1 wherein said information comprises a public key certificate for encrypting said instant message being sent to said corresponding one of said plurality of mobile devices.

7. The method according to claim 2 wherein said information pertaining to said plurality of mobile devices is organized in a global address list on said contact server, said contact server serving said plurality of mobile devices, which belong to a same organization.

8. The method according to claim 1 wherein said instant message comprises an invitation to said new instant messaging contact to participate in said instant messaging session.

9. The method according to claim 8 wherein said invitation comprises additional data for obtaining an instant messaging application.

10. The method according to claim 9 wherein said additional data comprises any one or more of a link to a website providing said instant messaging application and an executable file for installing said instant messaging application.

11. The method according to claim 1, wherein said sending initiates a first instant messaging conversation with said new instant messaging contact.

12. The method according to claim 8 further comprising sending another instant message to begin said instant messaging session.

13. A non-transitory computer readable medium comprising computer executable instructions for adding a new instant messaging contact to a contact list to enable instant messaging between a first mobile device and another mobile device associated with said new instant messaging contact, said instant messaging using personal identification numbers to enable instant messages to be sent between mobile devices, said computer executable instructions comprising instructions for:

providing a first option on said first mobile device for adding said new instant messaging contact without requiring an initial exchange with said other mobile device;

determining if said first mobile device and said new instant messaging contact are from a same organization; and when said first mobile device and said new instant messaging contact are determined to be from said same organization:

upon sensing selection of said first option, enabling entry of one or more characters for identifying said new instant messaging contact;

providing a second option on said first mobile device for initiating a lookup using said one or more characters;

upon sensing selection of said second option, providing said one or more characters in performance of said lookup to a host system associated with said same organization;

obtaining from said host system, a result list for said lookup indicating each match to said one or more characters and including information pertaining to each match, said information for at least one match comprising a respective personal identification number for a corresponding mobile device;

if said new instant messaging contact is in said result list, enabling selection of said new instant messaging contact from said result list and obtaining said respective personal identification number for said corresponding mobile device after detecting selection thereof;

adding said new instant messaging contact to said contact list; and sending an instant message directly to said new instant messaging contact via a personal identification number based messaging protocol using said respective personal identification number.

14. The computer readable medium according to claim 13 wherein said host system comprises a contact server storing information pertaining to a plurality of mobile devices including said first mobile device and a second mobile device corresponding to said new instant messaging contact, said information comprising said data used to send said instant messages to a corresponding one of said plurality of mobile devices.

15. The computer readable medium according to claim 13 wherein said respective personal identification number is used for addressing said instant message to said corresponding mobile device.

16. The computer readable medium according to claim 15 wherein said respective personal identification number is unique to said corresponding mobile device, said respective personal identification number being used in a personal identification number to personal identification number messaging protocol for exchanging said instant messages.

17. The computer readable medium according to claim 13 wherein said result list further comprises contact details pertaining to each match.

18. The computer readable medium according to claim 13 wherein said [information comprises a public key certificate for encrypting said instant message being sent to said corresponding one of said plurality of mobile devices.

19. The computer readable medium according to claim 13 wherein said information pertaining to said plurality of mobile devices is organized in a global address list on said contact server, said contact server serving said plurality of mobile devices, which belong to a same organization.

20. The computer readable medium according to claim 13 wherein said instant message comprises an invitation to said new instant messaging contact to participate in said instant messaging session.

21. The computer readable medium according to claim 20 wherein said invitation comprises additional data for obtaining an instant messaging application.

22. The computer readable medium according to claim 21 wherein said additional data comprises any one or more of a link to a website providing said instant messaging application and an executable file for installing said instant messaging application.

23. The computer readable medium according to claim 13, wherein said sending initiates a first instant messaging conversation with said new instant messaging contact.

24. The computer readable medium according to claim 20 further comprising instructions for sending another instant message to begin said instant messaging session.

25. A mobile device comprising a processor, a communication sub-system, an instant messaging application, and a memory, the memory comprising computer executable instructions for adding a new instant messaging contact to a contact list to enable instant messaging between a first mobile device and another mobile device associated with said new instant messaging contact, said instant messaging using personal identification numbers to enable instant messages to be sent between mobile devices, said computer executable instructions comprising instructions for:

providing a first option on said first mobile device for adding said new instant messaging contact without requiring an initial exchange with said other mobile device;

determining if said first mobile device and said new instant messaging contact are from a same organization; and when said first mobile device and said new instant messaging contact are determined to be from said same organization:

upon sensing selection of said first option, enabling entry of one or more characters for identifying said new instant messaging contact;

providing a second option on said first mobile device for initiating a lookup using said one or more characters;

upon sensing selection of said second option, providing said one or more characters in performance of said lookup to a host system associated with said same organization;

obtaining from said host system, a result list for said lookup indicating each match to said one or more characters and including information pertaining to each match, said information for at least one match comprising a respective personal identification number for a corresponding mobile device;

if said new instant messaging contact is in said result list, enabling selection of said new instant messaging contact from said result list and obtaining said respective personal identification number for said corresponding mobile device after detecting selection thereof;

adding said new instant messaging contact to said contact list; and sending an instant message directly to said new instant messaging contact via a personal identification number based messaging protocol using said respective personal identification number.

26. The mobile device according to claim 25 wherein said host system comprises a contact server storing information pertaining to a plurality of mobile devices including said first mobile device and a second mobile device corresponding to said new instant messaging contact, said information comprising said data used to send said instant messages to a corresponding one of said plurality of mobile devices.

27. The mobile device according to claim 25 wherein said respective personal identification number is used for addressing said instant message to said corresponding mobile device.

28. The mobile device according to claim 27 wherein said respective personal identification number is unique to said corresponding mobile device, said respective personal identification number being used in a personal identification number to personal identification number messaging protocol for exchanging said instant messages.

29. The mobile device according to claim 25 wherein said result list further comprises contact details pertaining to each match.

30. The mobile device according to claim 25 wherein said information comprises a public key certificate for encrypting said instant message being sent to said corresponding one of said plurality of mobile devices.

31. The mobile device according to claim 25 wherein said information pertaining to said plurality of mobile devices is organized in a global address list on said contact server, said contact server serving said plurality of mobile devices, which belong to a same organization.

32. The mobile device according to claim 25 wherein said instant message comprises an invitation to said new instant messaging contact to participate in said instant messaging session.

33. The mobile device according to claim 32 wherein said invitation comprises additional data for obtaining an instant messaging application.

34. The mobile device according to claim 33 wherein said additional data comprises any one or more of a link to a website providing said instant messaging application and an executable file for installing said instant messaging application.

35. The mobile device according to claim 25, wherein said sending initiates a first instant messaging conversation with said new instant messaging contact.

36. The mobile device according to claim 32 further comprising instructions for sending another instant message to begin said instant messaging session.

* * * * *